(12) United States Patent
Sasaki et al.

(10) Patent No.: US 11,960,099 B2
(45) Date of Patent: Apr. 16, 2024

(54) ATTACHMENT PRODUCING ANAMORPHIC EFFECT

(71) Applicant: Panavision International, L.P., Woodland Hills, CA (US)

(72) Inventors: Daniel Keith Sasaki, Glendale, CA (US); Brian Grant Mills, Granada Hills, CA (US); Rick Takeshi Ishioka, Woodland Hills, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 17/590,789

(22) Filed: Feb. 1, 2022

(65) Prior Publication Data
US 2022/0299783 A1 Sep. 22, 2022

Related U.S. Application Data

(63) Continuation of application No. 16/559,562, filed on Sep. 3, 2019, now Pat. No. 11,237,400, which is a
(Continued)

(51) Int. Cl.
*G02B 27/09* (2006.01)
*G02B 13/02* (2006.01)
(Continued)

(52) U.S. Cl.
CPC ......... *G02B 27/0966* (2013.01); *G02B 13/02* (2013.01); *G02B 13/08* (2013.01);
(Continued)

(58) Field of Classification Search
CPC .... G02B 27/0966; G02B 13/02; G02B 13/08; G02B 13/22; G02B 15/10; G02B 27/0037; G03B 17/565; G03B 37/06
(Continued)

(56) References Cited

U.S. PATENT DOCUMENTS

| 3,749,477 A | 7/1973 | Willoughby et al. |
| 5,184,880 A | 2/1993 | Lisziewicz |

(Continued)

FOREIGN PATENT DOCUMENTS

| DE | 4104684 C1 | 6/1992 |
| JP | S35011376 B | 8/1960 |

(Continued)

OTHER PUBLICATIONS

International Search Report dated Apr. 25, 2019 in corresponding International Application No. PCT/US2019/017555 filed Feb. 11, 2019; total 3 pages.
(Continued)

*Primary Examiner* — William Choi
(74) *Attorney, Agent, or Firm* — Snell & Wilmer L.L.P.

(57) ABSTRACT

Apparatuses, systems, and methods for producing non-rotationally symmetric optical aberrations. Such aberrations may be created by a removable attachment that may be attached to another lens, such as a spherical lens. Aberrations that appear to reproduce an anamorphic effect may be produced, yet the underlying camera system may remain a spherical camera system, and the capture mode may remain non-anamorphic.

19 Claims, 22 Drawing Sheets

Related U.S. Application Data continuation of application No. 15/894,764, filed on Feb. 12, 2018, now Pat. No. 10,401,634.

(51) Int. Cl.

| | |
|---|---|
| *G02B 13/08* | (2006.01) |
| *G02B 13/22* | (2006.01) |
| *G02B 15/10* | (2006.01) |
| *G03B 17/56* | (2021.01) |
| *G03B 37/06* | (2021.01) |
| *G02B 27/00* | (2006.01) |

(52) U.S. Cl.
CPC ............. *G02B 13/22* (2013.01); *G02B 15/10* (2013.01); *G03B 17/565* (2013.01); *G03B 37/06* (2013.01); *G02B 27/0037* (2013.01)

(58) Field of Classification Search
USPC .................................................. 359/668, 710
See application file for complete search history.

(56) References Cited

U.S. PATENT DOCUMENTS

| | | | |
|---|---|---|---|
| 6,072,636 A | 6/2000 | Sato | |
| 6,181,482 B1 | 1/2001 | Grafton | |
| 10,401,634 B1 | 9/2019 | Sasaki et al. | |
| 2005/0168829 A1 | 8/2005 | Nurishi et al. | |
| 2017/0374253 A1 | 12/2017 | Cahall et al. | |

FOREIGN PATENT DOCUMENTS

| | | | |
|---|---|---|---|
| JP | H05288987 A | | 11/1993 |
| JP | 2004118056 A | * | 4/2004 |
| JP | 2004118057 A | | 4/2004 |
| WO | 2019157474 A1 | | 8/2019 |

OTHER PUBLICATIONS

Written Opinion of the International Searching Authority dated Apr. 25, 2019 in corresponding International Application No. PCT/US2019/017555 filed Feb. 11, 2019; total 5 pages.
International Preliminary Report on Patentability dated Aug. 18, 2020 in corresponding International Application No. PCT/US2019/017555 filed Feb. 11, 2019; total 6 pages.
Notice of Allowance dated May 3, 2019 in corresponding U.S. Appl. No. 15/894,764, filed Feb. 12, 2018; total 8 pages.
Non-Final Office Action dated Nov. 13, 2020 in corresponding U.S. Appl. No. 16/559,562, filed Sep. 3, 2019; total 12 pages.
Non-Final Office Action dated May 18, 2021 in corresponding U.S. Application Serial No. 116/559,562 filed Sep. 3, 2019; total 9 pages.
Notice of Allowance dated Sep. 15, 2021 in corresponding U.S. Appl. No. 16/559,562, filed Sep. 3, 2019; total 7 pages.
Corrected Notice of Allowability dated Dec. 27, 2021 in corresponding U.S. Appl. No. 16/559,562, filed Sep. 3, 2019; total 2 pages.

* cited by examiner

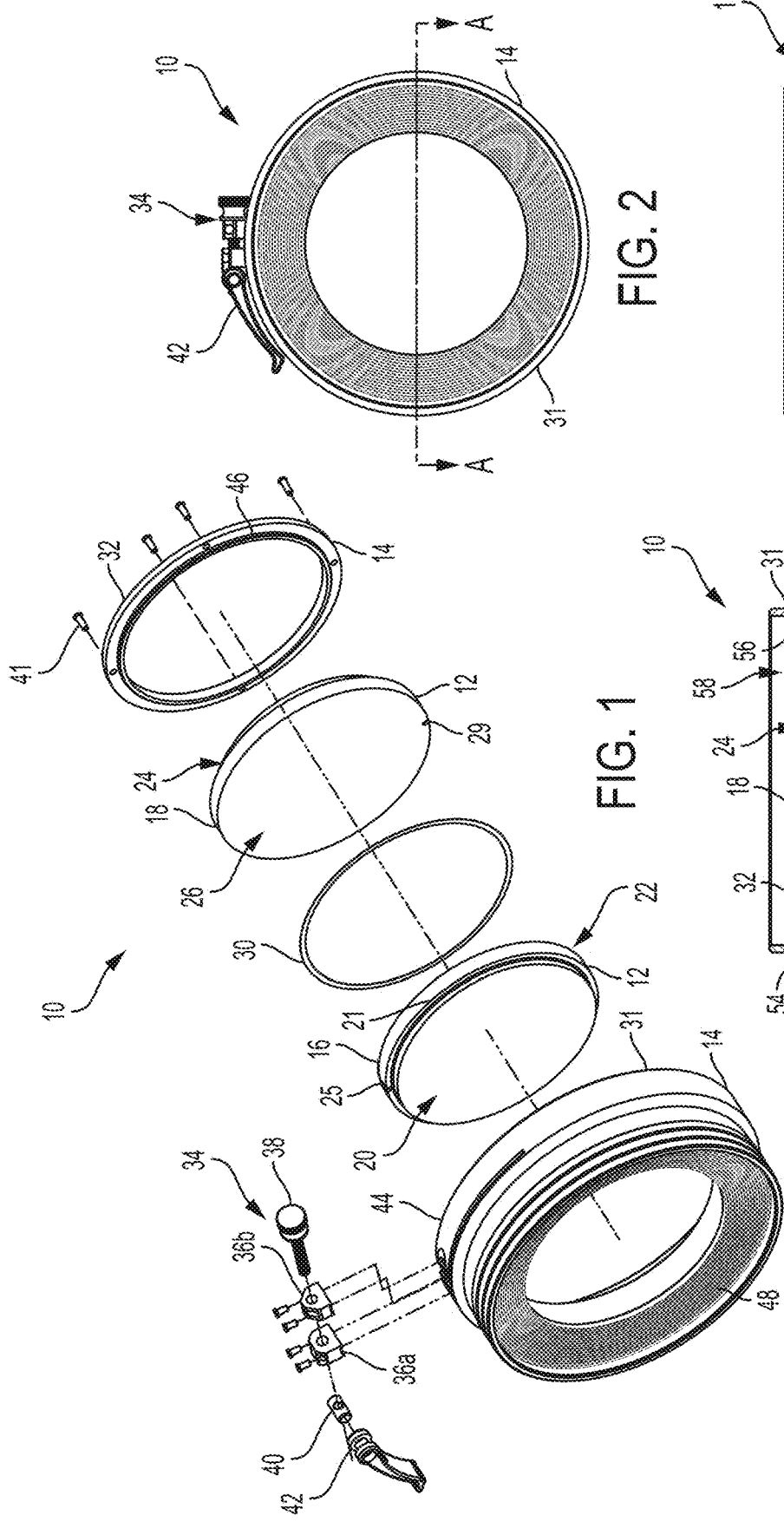

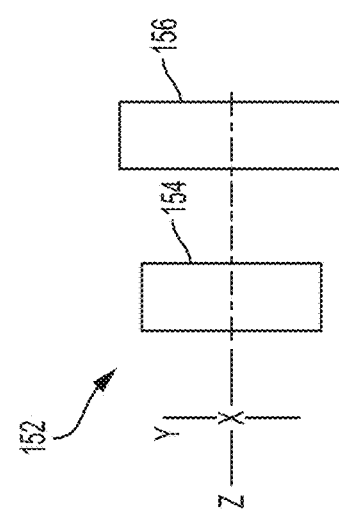
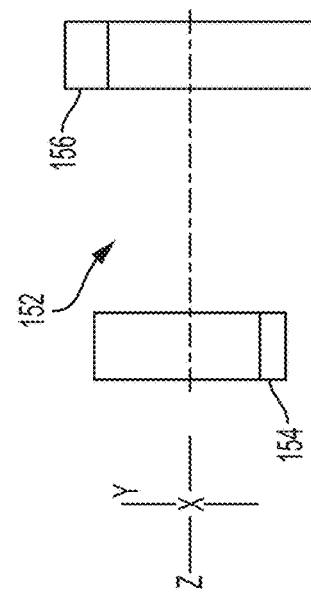
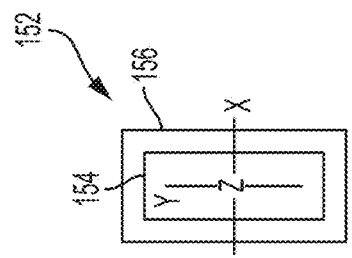
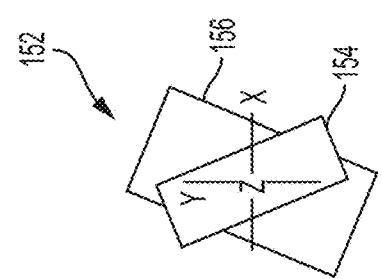
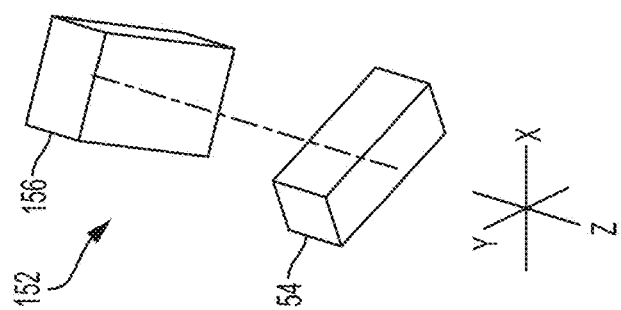
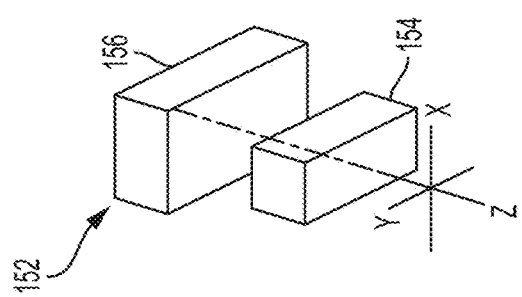

ATTACHMENT PRODUCING ANAMORPHIC EFFECT

CROSS-REFERENCE TO RELATED APPLICATIONS

This patent application is a continuation of and claims priority to U.S. patent application Ser. No. 16/559,562 filed Sep. 3, 2019, now U.S. Pat. No. 11,237,400, which is a continuation of U.S. patent application Ser. No. 15/894,764 filed Feb. 12, 2018, now U.S. Pat. No. 10,401,634, which applications are hereby incorporated by reference in their entirety.

BACKGROUND

Camera imaging systems used in the film industry and the like have traditionally captured images in an anamorphic format. The anamorphic format involves compression of the optical image being captured so that a large field of view with a large aspect ratio could be captured at a smaller area. This allows image quality to remain high, but cost and space savings to be realized without using a larger imaging format. The anamorphic images that are captured are later projected through an anamorphic projection lens to un-squeeze the image at a larger aspect ratio for display.

The anamorphic image capture process, however, introduces aberrations in the captured images that have a distinctive cinematographic look. Such aberrations include optical flare, coma, and other aberrations that characterize the appearance of an anamorphic capture.

The advent of digital image capture systems has increased the desire of individuals to use anamorphic format and anamorphic lenses. However, spherical lens capture systems are typically less complex and expensive to construct and maintain than anamorphic systems, thus reducing the availability of anamorphic systems.

The nostalgia present with an anamorphic capture process, however, remains with many directors, cinematographers, and other individuals. Many individuals appreciate the aberrations that are present with an anamorphic image capture process and seek to introduce such aberrations in their image capture. Other non-film industry individuals also seek to introduce such aberrations into their images (e.g., amateur photographers, users of camera phones, etc.).

Digital and post-production processes have been developed to digitally introduce such aberrations into captured images. Such digital aberrations, however, are off-putting to many and do not represent an authentic effort at recreating the aberrations present in an anamorphic capture system.

SUMMARY

The present disclosure is directed to apparatuses, systems, and methods for producing non-rotationally symmetric optical aberrations. Such aberrations may be created by a removable attachment that may be attached to another lens, such as a spherical lens. As such, aberrations that appear to reproduce an anamorphic effect may be produced, yet the underlying camera system may remain a spherical camera system, and the capture mode may remain non-anamorphic. The camera systems may not only be filming camera systems, but may extend to a variety of types of camera systems (e.g., still photography camera systems, mobile devices, among others).

A removable attachment for a camera system is disclosed herein. The removable attachment may comprise a lens group including at least two cylindrical lens elements. The lens group may be configured to induce non-rotationally symmetric optical aberrations in a spherical lens that does not have any optical aberrations. A housing may be coupled to the lens group and may be configured to removably attach to a camera lens such that the lens group is positioned between an object space and the camera lens when the housing is attached to the camera lens.

A camera lens system is disclosed herein. The camera lens system may include a spherical lens and a removable attachment. The removable attachment may include a lens group including at least two cylindrical lens elements, the lens group being configured to induce non-rotationally symmetric optical aberrations in the spherical lens. A housing may be coupled to the lens group and may be configured to removably attach to the spherical lens such that the lens group is positioned between an object space and the spherical lens when the housing is attached to the spherical lens.

A method is disclosed herein. The method may comprise providing a removable attachment. The removable attachment may include a lens group including at least two cylindrical lens elements. The removable attachment may include a housing coupled to the lens group and configured to removably attach to a lens such that the lens group is positioned between an object space and the lens when the housing is attached to the lens. The method may include inducing, with the lens group, non-rotationally symmetric optical aberrations in the lens.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 1 illustrates a perspective assembly view of a removable attachment for a camera system according to an embodiment of the present disclosure.

FIG. 2 illustrates a front view of the removable attachment that is shown in FIG. 1.

FIG. 3 illustrates a side cross sectional view of the removable attachment that is shown in FIG. 1 along line A-A of FIG. 2.

FIG. 4 illustrates a side exterior view of the removable attachment that is shown in FIG. 1.

FIGS. 30A and 30B illustrate a perspective schematic view of an embodiment of a lens group according to an embodiment of the present disclosure.

FIG. 31A illustrates front schematic view of the embodiment of the lens group shown in FIGS. 30A and 30B.

FIG. 31B illustrates a side schematic view of the embodiment of the lens group in the configuration shown in FIG. 31A.

FIG. 32A illustrates a front schematic view of the embodiment of the lens group shown in FIGS. 30A and 30B.

FIG. 32B illustrates a side schematic view of the embodiment of the lens group in the configuration shown in FIG. 32A.

DETAILED DESCRIPTION

Figure 7:
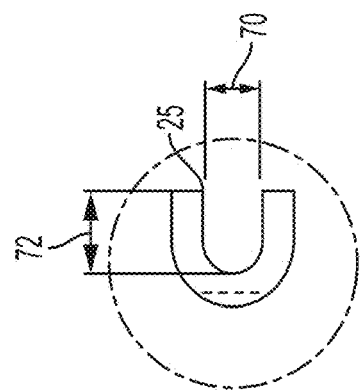
FIG. 7 illustrates a detail view of the positioning feature that is shown in FIG. 6.

FIG. 1 illustrates a perspective assembly view of a removable attachment 10 for a camera system according to an embodiment of the present disclosure. The removable attachment 10 includes a lens group 12. The removable attachment 10 includes a housing 14.

The lens group 12 includes cylindrical lens elements 16, 18. Cylindrical lens element 16 may include a cylindrical lens surface 20 that is positive (convex with regard to the body of the lens element 16) and faces towards an object space. Object space is space including objects or areas to be imaged through the removable attachment 10. Cylindrical lens element 16 may include lens surface 22 (apparent in FIG. 5) that is planar. Cylindrical lens surface 20 and lens surface 22 face opposite directions.

A recess 21 may be provided with cylindrical lens element 16 to allow for mating with the housing 14. The recess 21 may extend circumferentially around the cylindrical lens element 16, and may be configured to mate with a lip 23 of the housing 14.

Figure 6:
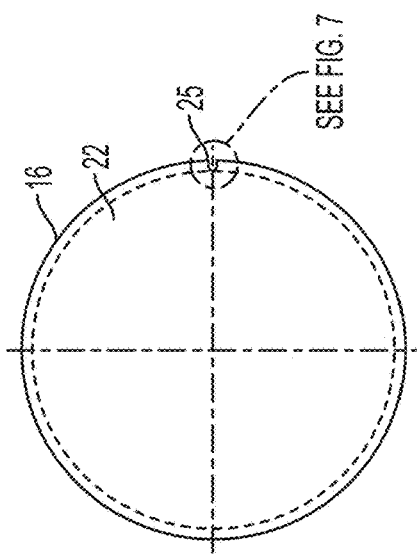
FIG. 6 illustrates a rear view of the cylindrical lens element that is shown in FIG. 5.

The cylindrical lens element 16 may include a positioning feature 25. The positioning feature 25 may comprise a notch as shown in FIG. 6.

Cylindrical lens element 18 may include a cylindrical lens surface 24 (visible in FIGS. 3 and 8) that is negative (concave with regard to the body of the lens element 18) and faces opposite the object space. The cylindrical lens element 18 may also include a lens surface 26 that is planar. The lens surface 24 and lens surface 26 face opposite directions from each other.

A recess 27 may be provided with the cylindrical lens element 18 to allow for mating with the housing 14. The recess 27 may extend circumferentially around the cylindrical lens element 18.

Figure 9:
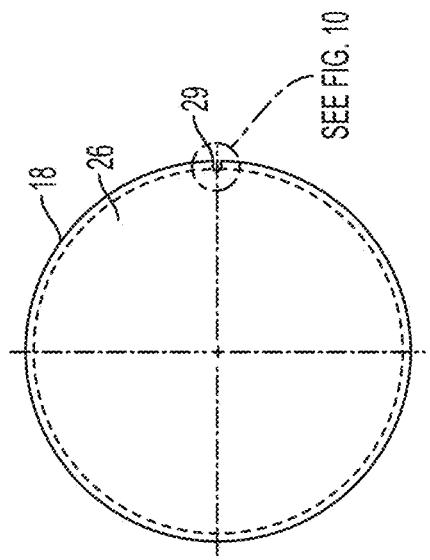
FIG. 9 illustrates a rear view of the cylindrical lens element that is shown in FIG. 8.

The cylindrical lens element 18 may include a positioning feature 29. The positioning feature 29 may comprise a notch as shown in FIG. 9.

The cylindrical lens element 16 and cylindrical lens element 18 may be positioned adjacent to each other within the housing 14. The cylindrical lens elements 16 and 18 may be positioned such that planar lens surfaces 22, 26 face each other. A shim 30 may separate the cylindrical lens elements 16 and 18 from contact with one another. The shim 30 may be positioned between and sandwiched between the cylindrical lens elements 16 and 18 at the outer periphery of the lens elements 16 and 18. The shim 30 may serve to increase the presence of optical flares induced by the lens group 12 and increase the intensity of the non-rotationally symmetric optical aberrations induced by the lens group 12. Increasing the thickness of the shim 30 may increase the intensity of the optical flares induced by the lens group 12 and increase the intensity of the non-rotationally symmetric optical aberrations induced by the lens group 12. The thickness of the shim 30 is the dimension along the optical axis. In one embodiment, the shim 30 may have a thickness of 0.012 millimeters. In one embodiment, the shim 30 may have a thickness of at least 0.012 millimeters. In other embodiments, the thickness may be varied to produce the desired optical result. Increasing the thickness may increase the sine difference of the path length and increase the astigmatism of the system. A larger shim 30 thickness, and gap between the lens elements 16 and 18, may increase the distance the light can reflect upon itself and create more flares.

The housing 14 may include the housing body 31 and a securing ring 32. The housing 14 may extend around the lens group 12 and the shim 30. The housing 14 may extend circumferentially around the lens group 12 and the shim 30. The housing 14 may serve to hold the cylindrical lens element 16 to the cylindrical lens element 18. The housing body 31 may have a cylindrical shape as shown in FIG. 1. In other embodiments, the shape may be varied from that shown in FIG. 1.

The housing 14 may be configured to removably attach to another structure, which may comprise a camera lens. The housing 14 may include an attachment device, which in FIG. 1 is shown in the form of a clamp 34 and flexible portions or arms 44. The clamp 34 may be in form shown in FIG. 1, which may include eyelets 36a, b, screw 38, axle 40 and tightening cam lever 42. The clamp 34 may be configured to be integral with the housing 14, as shown in FIG. 1. The housing body 31 may include the flexible portions or arms 44 that are moved by the clamp 34. The flexible portions may be compressed against another structure, such as a camera lens to attach to the other structure. The attachment device may allow the removable attachment 10 to be attached and removed to another structure as desired by user operation.

The securing ring 32 attaches to the housing body 31 via screws 41 or rivets or the like. The securing ring 32 may press against the lens group 12 to hold the lens group 12 in position. The securing ring 32 may include a lip 46 that mates with the recess 27 (marked in FIG. 8) of the cylindrical lens element 18.

FIG. 2 illustrates a front view of the removable attachment 10. The outer diameter of the housing 14 is larger than outer diameter of either of the cylindrical lens elements 16, 18.

FIG. 3 illustrates a side cross sectional view of the removable attachment 10 along line A-A of FIG. 2. The cylindrical lens elements 16, 18 are visible positioned adjacent to each other with their respective planar lens surfaces facing each other. The positive cylindrical lens surface 20 of the cylindrical lens element 16 extends from the front face 48 of the housing body 31. The negative cylindrical lens surface 24 of the cylindrical lens element 18 is recessed relative to the securing ring 32. The front face 48 of the housing body 31 may have a forward extending rim 50 to protect the positive cylindrical lens surface 20 of the cylindrical lens element 16 from contact when the removable attachment 10 is resting on a surface. An inner wall 52 extends rearward from the front face 48 and encircles the cylindrical lens elements 16, 18. An outer wall 54 of the housing body 31 extends rearward from the outer periphery of the front face 48, and forms an outer surface of the housing body 31. The inner wall 52 and outer wall 54 are separated from each other by a cavity 56. In addition, the outer wall 54 may form a cavity 58 for receiving the structure that the removable attachment 10 attaches to, for example a camera lens or the like. A housing of a camera lens may insert into the cavity 58. The attachment device of the housing 14 may attach to the housing of the camera lens when the housing of the camera lens is inserted into the cavity 58.

FIG. 4 illustrates a side exterior view of the removable attachment 10 showing the housing 14.

Figure 5:
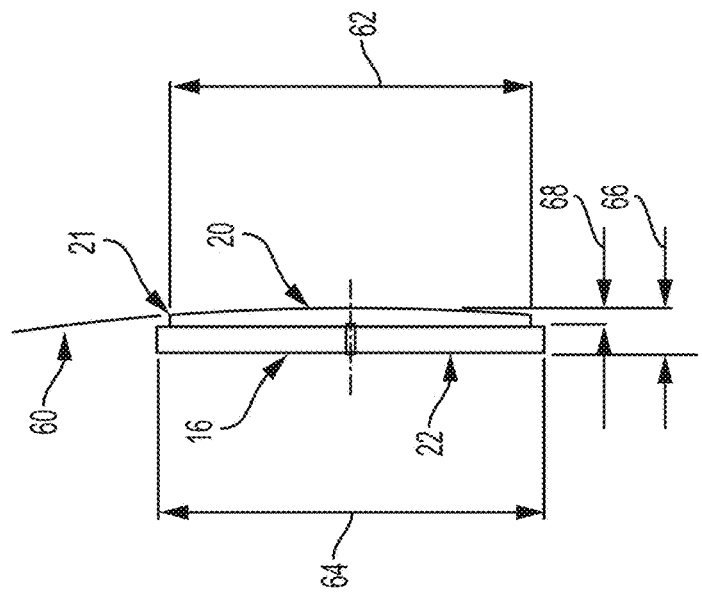
FIG. 5 illustrates a side view of a cylindrical lens element according to an embodiment of the present disclosure.

FIG. 5 illustrates a side view of the cylindrical lens element 16 including the cylindrical lens surface 20 that is positive (convex with regard to the body of the lens element 16). Exemplary dimensions of the cylindrical lens element 16 are provided herein. It is to be understood in other embodiments the dimensions may be varied. For example, the dimensions disclosed herein may be varied to capture in multiple formats, such as with mobile devices (e.g., cellular phones), or still photography camera systems, or other system. In the embodiment shown in FIG. 5, the positive cylindrical lens surface 20 may have a radius of curvature 60 corresponding to 1 diopter. The radius of curvature 60 may be about 515 millimeters. A diameter 62 of the positive cylindrical lens surface 20 may be about 76 millimeters. A diameter 64 of the planar lens surface 22 may be about 81 millimeters. A thickness 66 of the cylindrical lens element may be about 9.5 millimeters. A thickness 68 of the cylindrical lens element 16 from the positive cylindrical lens surface 20 to the edge of the recess 21 may be about 3.8 millimeters.

FIG. 6 illustrates a rear view of the cylindrical lens element 16. The positioning feature 25 is shown on an outer edge of the cylindrical lens element 16.

FIG. 7 illustrates a detail view of the positioning feature 25 shown in FIG. 6. Exemplary dimensions of the positioning feature 25 are provided herein. It is to be understood in other embodiments the dimensions may be varied. A width 70 of the positioning feature 25 may be about 1.6 millimeters. A depth 72 of the positioning feature 25 may be about 2 millimeters.

Figure 8:
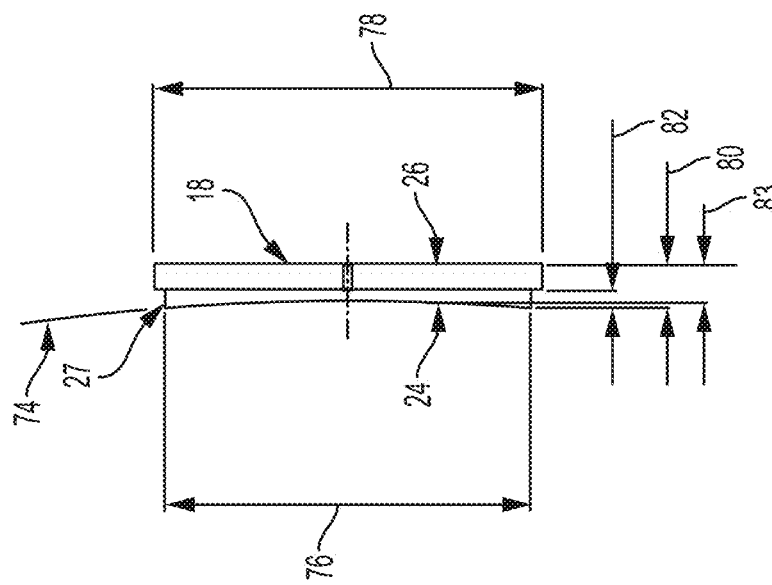
FIG. 8 illustrates a side view of a cylindrical lens element according to an embodiment of the present disclosure.

FIG. 8 illustrates a side view of the cylindrical lens element 18 including the cylindrical lens surface 24 that is negative (concave with regard to the body of the lens element 18). Exemplary dimensions of the cylindrical lens element 18 are provided herein. It is to be understood in other embodiments the dimensions may be varied. The negative cylindrical lens surface 24 may have a radius of curvature 74 corresponding to 1 diopter. The radius of curvature 74 may be about 515 millimeters. It is noted that the radius of curvature 74 of the negative cylindrical lens element 18 is the same as the radius of curvature 60 of the cylindrical lens element 16. A diameter 76 of the negative cylindrical lens surface 24 may be about 76 millimeters. A diameter 78 of the planar optical surface 26 may be about 81 millimeters. A thickness 80 of the cylindrical lens element 18 may be about 9.5 millimeters. A thickness 82 of the cylindrical lens element 18 from the edge of the negative cylindrical lens surface 24 to the edge of the recess 27 may be about 3.8 millimeters. A thickness 83 from the lowest portion of the negative cylindrical lens surface 24 to the planar lens surface 26 may be about 8 millimeters. It is noted that the dimensions of the cylindrical lens element 18 may be the same as those of the cylindrical lens element 16, aside from the direction of the respective radii of curvature 60, 74 differing in the two embodiments. The magnification produced by the lens group 12 may be configured to not produce any significant anamorphic compression. In one embodiment, the compression may not exceed 1.09 for any axial direction. In other embodiments, even lesser compression may be produced. The cylindrical lens elements 16 and 18 may be configured to have the same structural characteristics as each other, including the same radius, thickness, and substrate. In other embodiments, the structural characteristics of the cylindrical lens elements 16 and 18 may be varied from those shown in FIGS. 1-8 to produce a desired effect. The structural characteristics of the lens elements 16 and 18, however, may remain the same as each other, including the same radius, thickness, and substrate.

Figure 10:
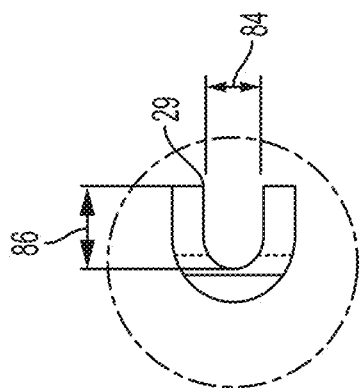
FIG. 10 illustrates a detail view of the positioning feature that is shown in FIG. 9.

FIG. 9 illustrates a rear view of the cylindrical lens element 18. The positioning feature 29 is shown on an outer edge of the cylindrical lens element 18. FIG. 10 illustrates a detail view of the positioning feature 29 shown in FIG. 9. Exemplary dimensions of the positioning feature 29 are provided herein. It is to be understood in other embodiments the dimensions may be varied. A width 84 of the positioning feature 29 may be about 1.6 millimeters. A depth 86 of the positioning feature 29 may be about 2 millimeters. It is noted that the dimensions of the positioning feature 29 may be the same as those of the positioning feature 25. Referring back to FIG. 1, the respective positioning features 25, 29 may serve to fix the cylindrical lens elements 16, 18 in a rotational position relative to each other. The cylindrical lens elements 16, 18 may be held in position relative to each other such that the powered axes of the cylindrical lens elements 16, 18 extend in the same plane.

The removable attachment 10, and particularly the lens group 12, serves to induce non-rotationally symmetric optical aberrations. The benefit of such a design is to provide optical aberrations that appear similar to those produced by a standard anamorphic lens arrangement. However, the removable attachment 10 may not produce the image compression associated with anamorphic photography and may allow for filming or other image capture or viewing in a non-anamorphic mode. Such a feature may allow for filming or other image capture or viewing in a non-anamorphic mode, while producing non-rotationally symmetric optical aberrations that may be desired by cinematographers, or photographic artists, or other users. For example, in one embodiment, the compression may not exceed 1.09 for any axial direction. In other embodiments, even lesser compression may be produced. The magnification may be slight and does not result in any significant anamorphic compression.

The removable attachment 10, and particularly the lens group 12, may induce the non-rotationally symmetric optical aberrations in a spherical lens that does not have any optical aberrations. Such a lens may be idealized, but the lens group 12 is configured such that if a spherical lens does not have any optical aberrations, then the lens group 12 positioned in line with such a lens will induce non-rotationally symmetric optical aberrations in that spherical lens. As such, the removable attachment 10 may be used as an overlay of a spherical lens, to induce the non-rotationally symmetric optical aberrations in a spherical lens. A user may be able to utilize a spherical lens that they may already possess, and may place the lens group 12 in line optically with the spherical lens to produce the non-rotationally symmetric optical aberrations. A user may be able to remove the removable attachment 10 from the spherical lens to remove the non-rotationally symmetric optical aberrations induced by the lens group 12.

Figure 11:
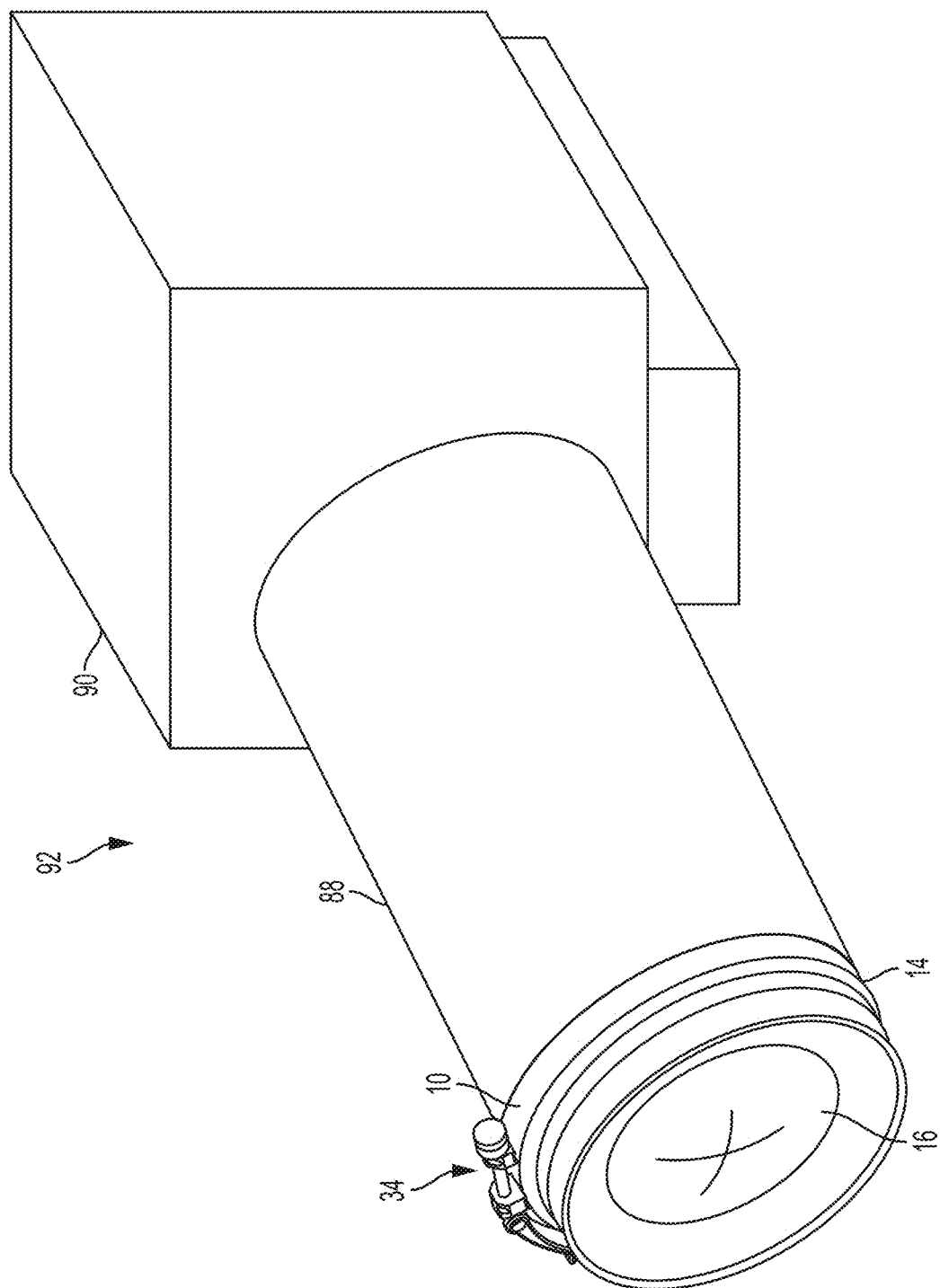
FIG. 11 illustrates the removable attachment shown in FIG. 1 attached to a spherical lens according to an embodiment of the present disclosure.

FIG. 11 illustrates an arrangement in which the removable attachment 10 is removably attached to a spherical lens 88. The spherical lens 88 may be coupled to a camera body 90 for capturing an image. The camera body 90 may be used to capture on film or digitally, or through other methods. The removable attachment 10, spherical lens 88, and camera body 90 together comprise a camera system 92. The spherical lens 88 may be configured to serve standard functions of a lens, which may include zoom and focus. The spherical lens 88 may be a nominally built photographic objective and may be configured to produce focused images for optical capture by the camera body 90.

The removable attachment 10 may be clamped to the end of the spherical lens 88, and particularly around the housing of the spherical lens 88. The removable attachment 10, and particularly the lens group 12 (marked in FIG. 1), may induce non-rotationally symmetric optical aberrations in the spherical lens 88. The resulting image may include such non-rotationally symmetric optical aberrations, and may have an anamorphic appearance even though the camera body 90 continues to image in a non-anamorphic mode. The removable attachment 10 may be removed from the spherical lens 88 to remove the non-rotationally symmetric optical aberrations induced by the lens group 12. The user of the camera system 92 can thus select whether to include such non-rotationally symmetric optical aberrations that are induced by the lens group 12.

Figure 12:
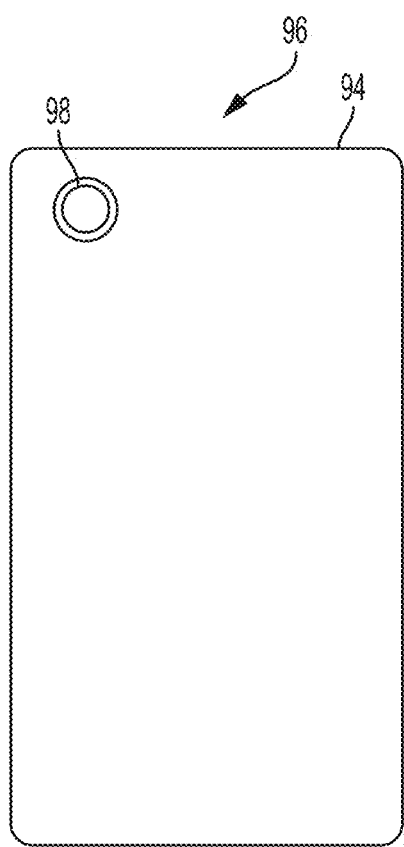
FIG. 12 illustrates a rear view of a mobile device according to an embodiment of the present disclosure.

FIG. 12 illustrates a rear view of a mobile device 94, which may comprise a mobile phone, a mobile web browser, a global positioning system unit, a personal digital assistant, or the like, or combinations thereof. Such devices may be referred to as an iPhone®, a Samsung Galaxy® or the like. Such devices now commonly include a camera system 96, which may include a spherical lens 98 or the like.

Figure 13:
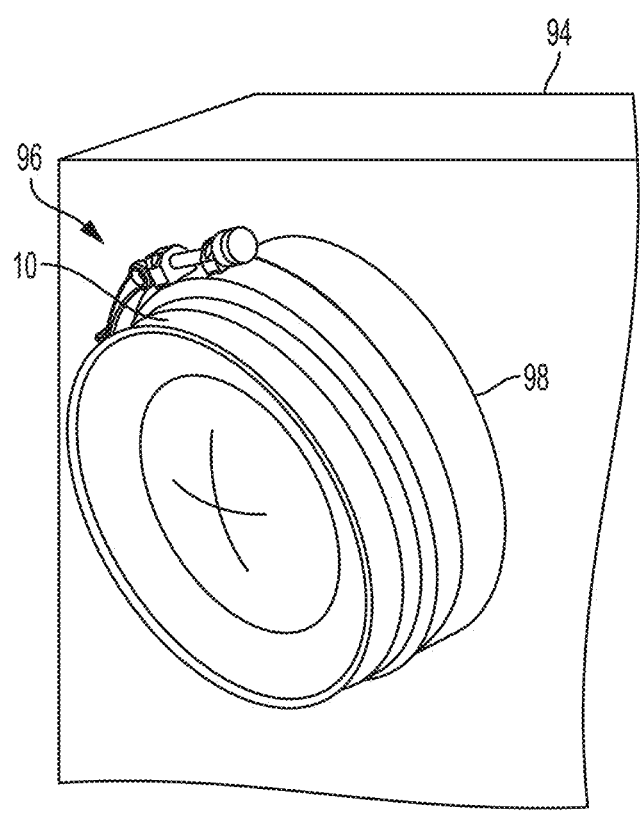
FIG. 13 illustrates a detail view of a camera system of the mobile device of FIG. 12 including the removable attachment of FIG. 1 attached thereon.

FIG. 13 illustrates a detail view of the camera system 96 including the removable attachment 10 positioned over the spherical lens 98. The removable attachment 10 may accordingly be scaled in size to fit on the spherical lens 98. Similar to the embodiment discussed in regard to FIG. 11, the removable attachment 10 may be selectively positioned on the spherical lens 98. The resulting image may include non-rotationally symmetric optical aberrations induced by the lens group 12, and may have an anamorphic appearance even though the camera system 96 continues to image in a non-anamorphic mode. The removable attachment 10 may be removed from the spherical lens 98 to remove the non-rotationally symmetric optical aberrations induced by the lens group 12. The removable attachment may be configured to join to the mobile device 94 or the spherical lens 98 via an attachment device that may include temporary adhesives, or structures mounted or keyed to the shape of the body of the mobile device 94, or other forms of attachment devices. In other embodiments, the lens of the mobile device may not be a spherical lens, but may be an anamorphic lens. The removable attachment may couple to the anamorphic lens in the same manner as coupling to the spherical lens. The removable attachment may serve to enhance the effect of the anamorphic lens. The removable attachment may conversely reduce the effect of an anamorphic lens if rotated by 90 degrees, thereby negating the anamorphic effect of the anamorphic lens.

Figure 14:
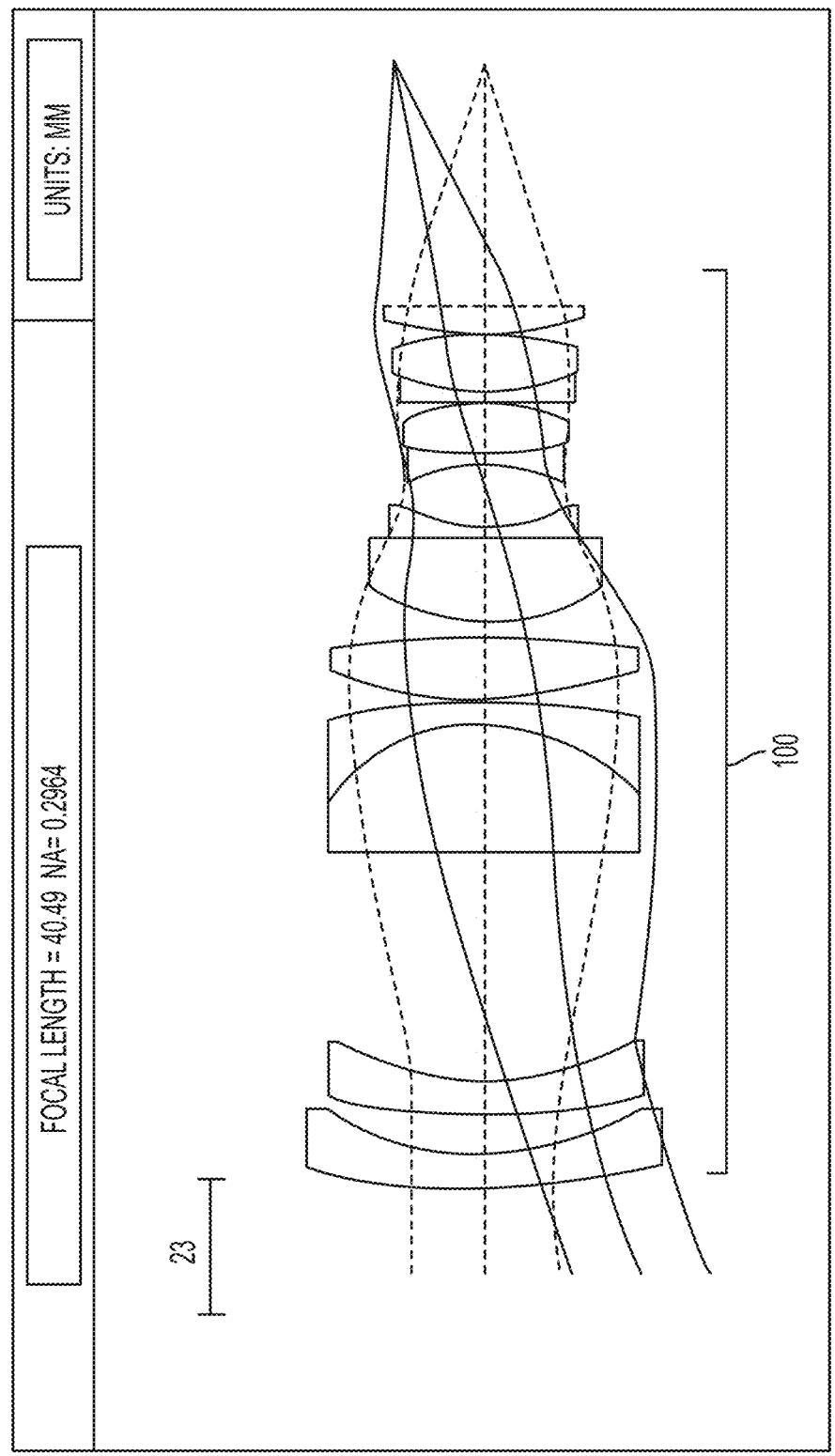
FIG. 14 illustrates a schematic of a spherical lens according to an embodiment of the present disclosure.

FIG. 14 illustrates a schematic of a spherical lens 100. The spherical lens 100 may be of a type utilized with the removable attachments and lens groups disclosed in this application. The spherical lens 100, for example, may be configured similarly as the spherical lens 88 disclosed in regard to FIG. 11. In other embodiments, the configuration of the spherical lens 100 may be varied. The term lens used herein may refer to multiple lens elements utilized in combination.

Figure 15:
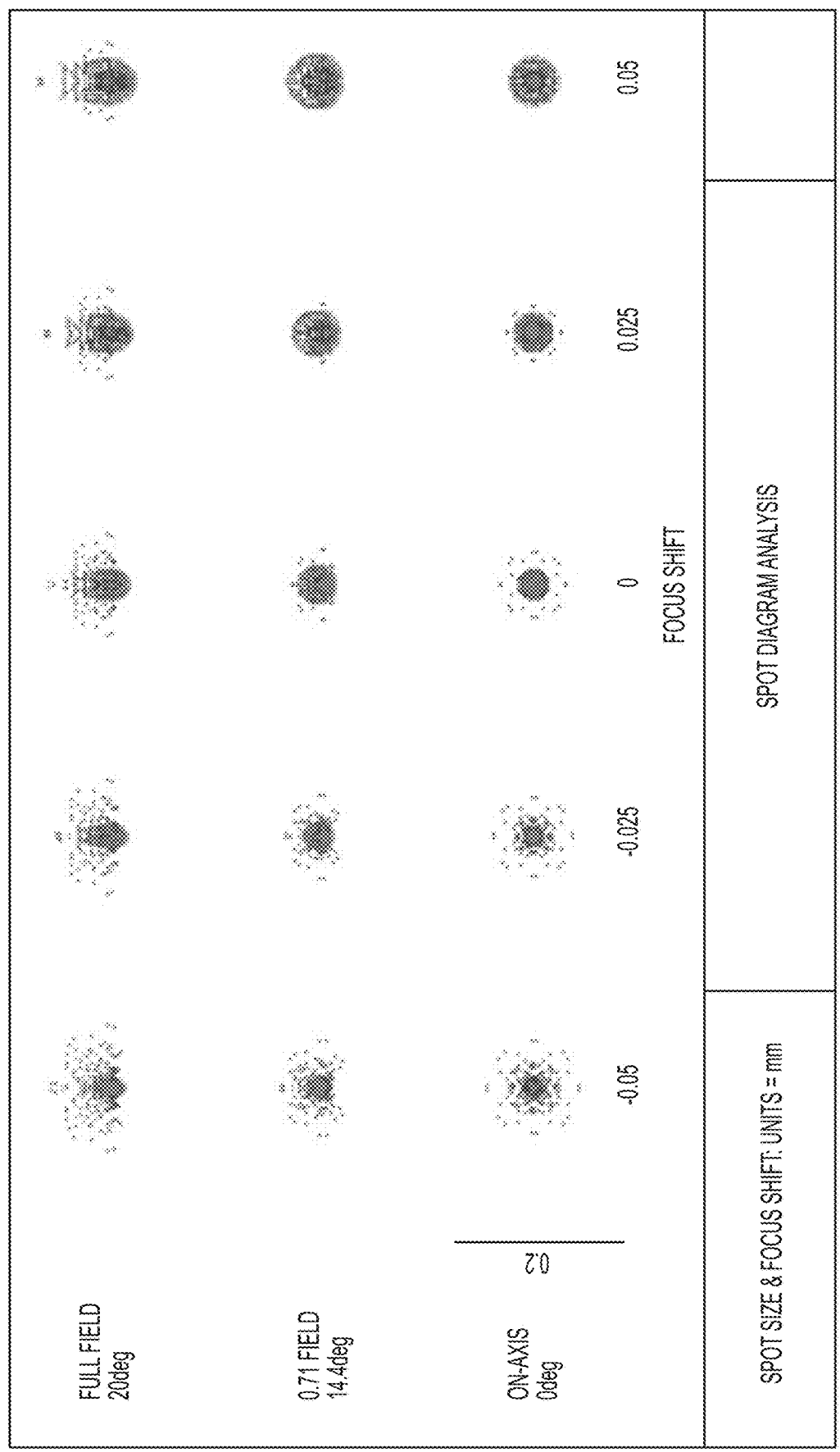
FIG. 15 illustrates a spot diagram analysis of the spherical lens that is shown in FIG. 14.
Figure 16:
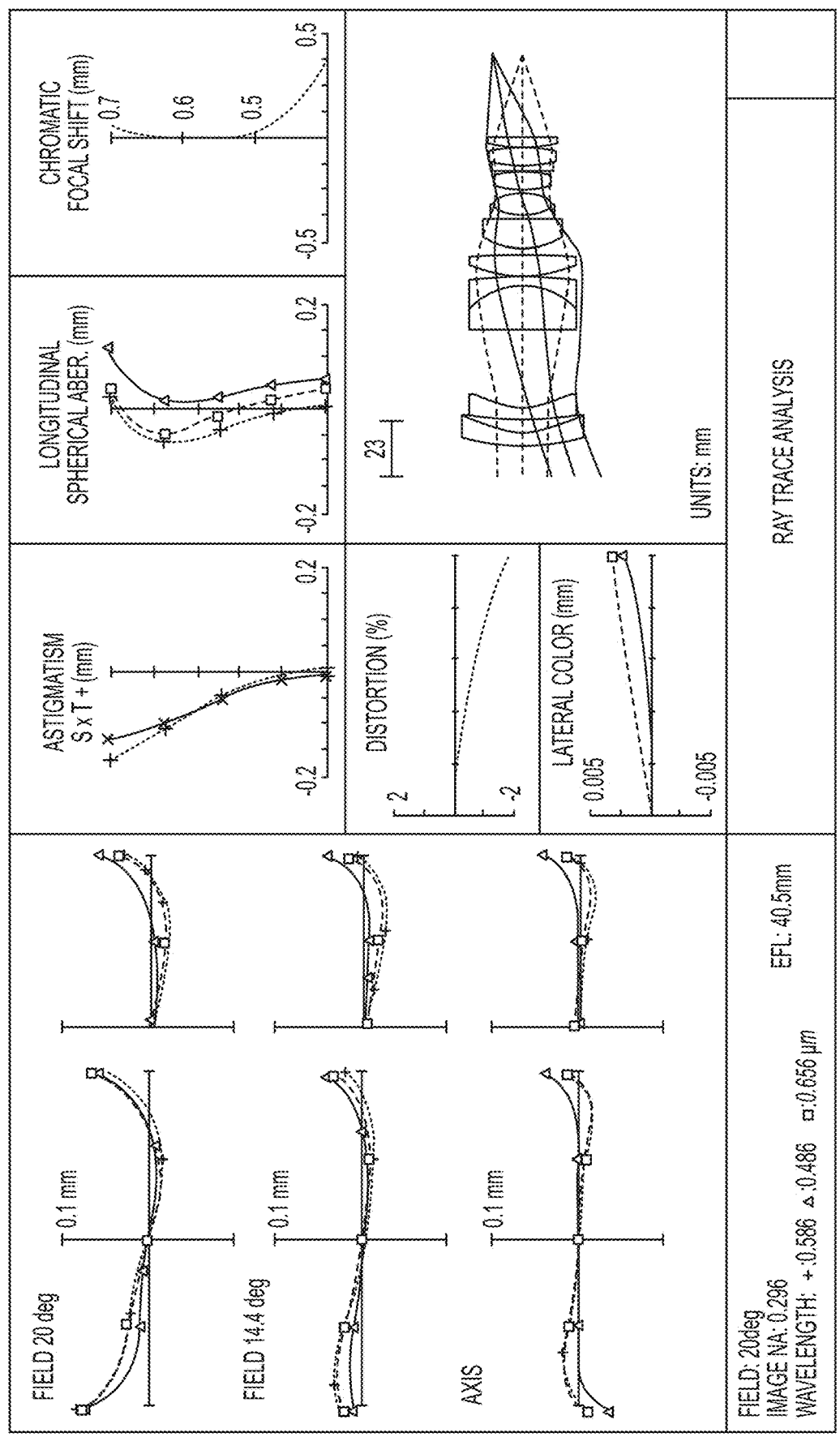
FIG. 16 illustrates a ray trace analysis of the spherical lens that is shown in FIG. 14.

FIG. 15 illustrates the spot diagram analysis of the spherical lens 100. FIG. 16 illustrates a ray trace analysis of the spherical lens 100 of FIG. 14. The removable attachments disclosed herein, and particularly the lens groups disclosed herein, are configured to induce non-rotationally symmetric optical aberrations in a spherical lens such as the spherical lens 100. The lens groups are configured to induce non-rotationally symmetric optical aberrations including astigmatism, coma, and flare. The lens groups may induce non-rotationally symmetric optical aberrations by producing an under-corrected state of spherical lens aberrations on the marginal ray. The over-corrected cylindrical aberrations may create elliptical out-of-focus characteristics, and may create horizontal flaring characteristics, such characteristics being associated with anamorphic photography or imaging. The lens groups may decomposition corrections present in a spherical lens and may uncorrect corrections present in a nominally built photographic objective.

The removable attachments disclosed herein, and particularly the lens groups disclosed herein, may also be configured to induce non-rotationally symmetric optical aberrations in an anamorphic lens. The same attachments and lens groups disclosed herein in regard to spherical lenses may also be utilized with anamorphic lenses. The removable attachments, and particularly the lens groups, may serve to enhance the effect of the anamorphic lens. The removable attachment may conversely reduce the effect of an anamorphic lens if rotated by 90 degrees, thereby negating the anamorphic effect of the anamorphic lens.

Figure 17:
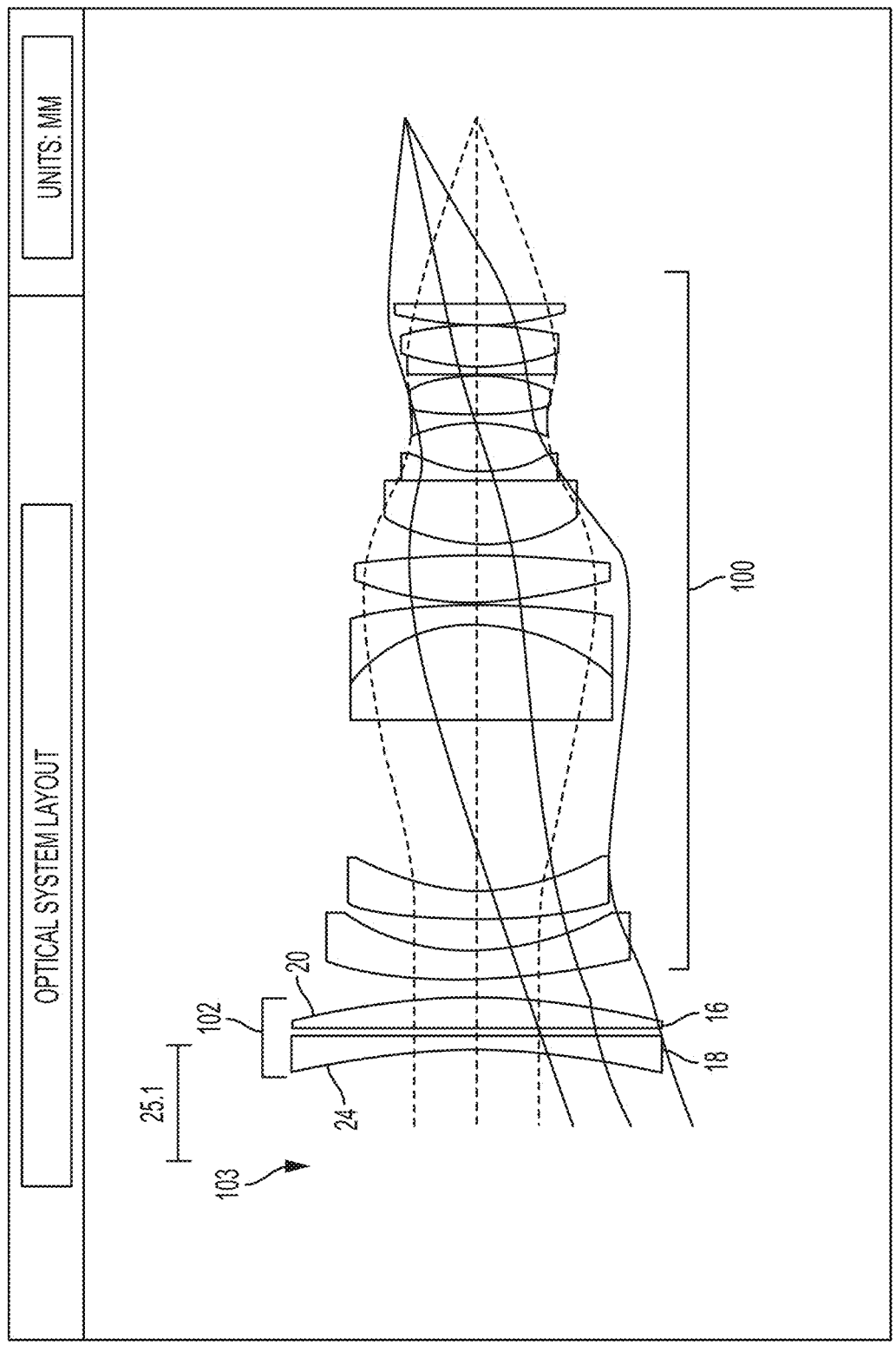
FIG. 17 illustrates a schematic of a lens group utilized in combination with the spherical lens that is shown in FIG. 14 according to an embodiment of the present disclosure.

FIG. 17 illustrates a schematic of a lens group 102 utilized in combination with the spherical lens 100. The lens group 102 may be configured the same as the lens group 12, however, the lens group 102 is rotated 180 degrees relative to the object space 103 such that the negative cylindrical lens surface 24 faces towards the object space 103 and the positive cylindrical lens surface 20 faces away from the object space 103 and towards the spherical lens 100. The lens group 102 may be attached to the spherical lens 100 in a manner disclosed herein, for example, by being part of a removable attachment that removably attaches to the spherical lens 100. Such removable attachment may include clamping to a housing of the spherical lens 100. The lens group 102 is positioned between the spherical lens 100 and the object space 103.

Figure 18:
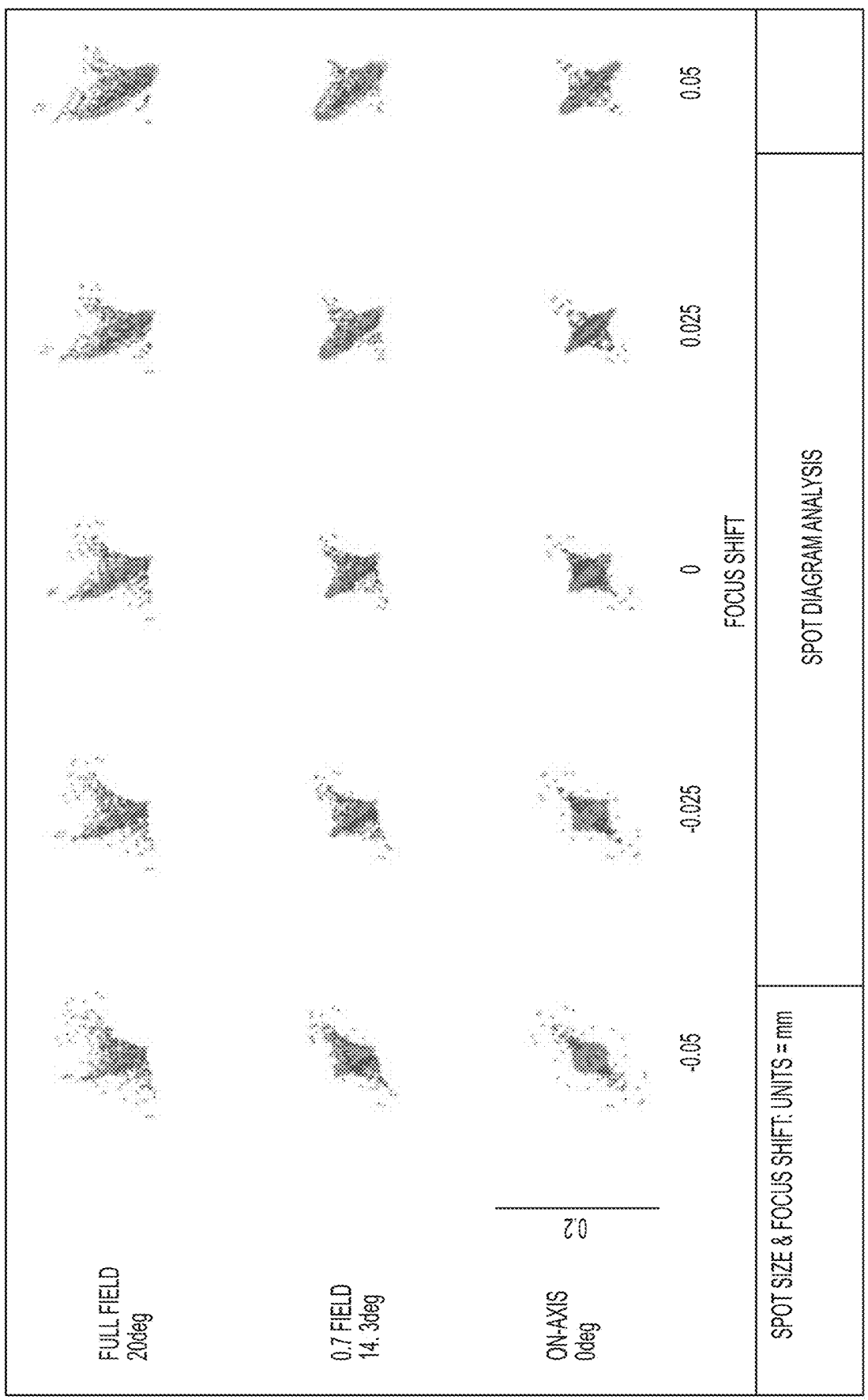
FIG. 18 illustrates a spot diagram analysis of the lens group utilized in combination with the spherical lens in FIG. 17 according to an embodiment of the present disclosure.

FIG. 18 illustrates the spot diagram analysis of the spherical lens 100 utilized in combination with the lens group 102 as shown in FIG. 17. The spherical lens 100 has the same structure as the spherical lens 100 shown in FIG. 14. However, the lens group 102 has induced non-rotationally symmetric optical aberrations in the spherical lens 100.

Figure 19:
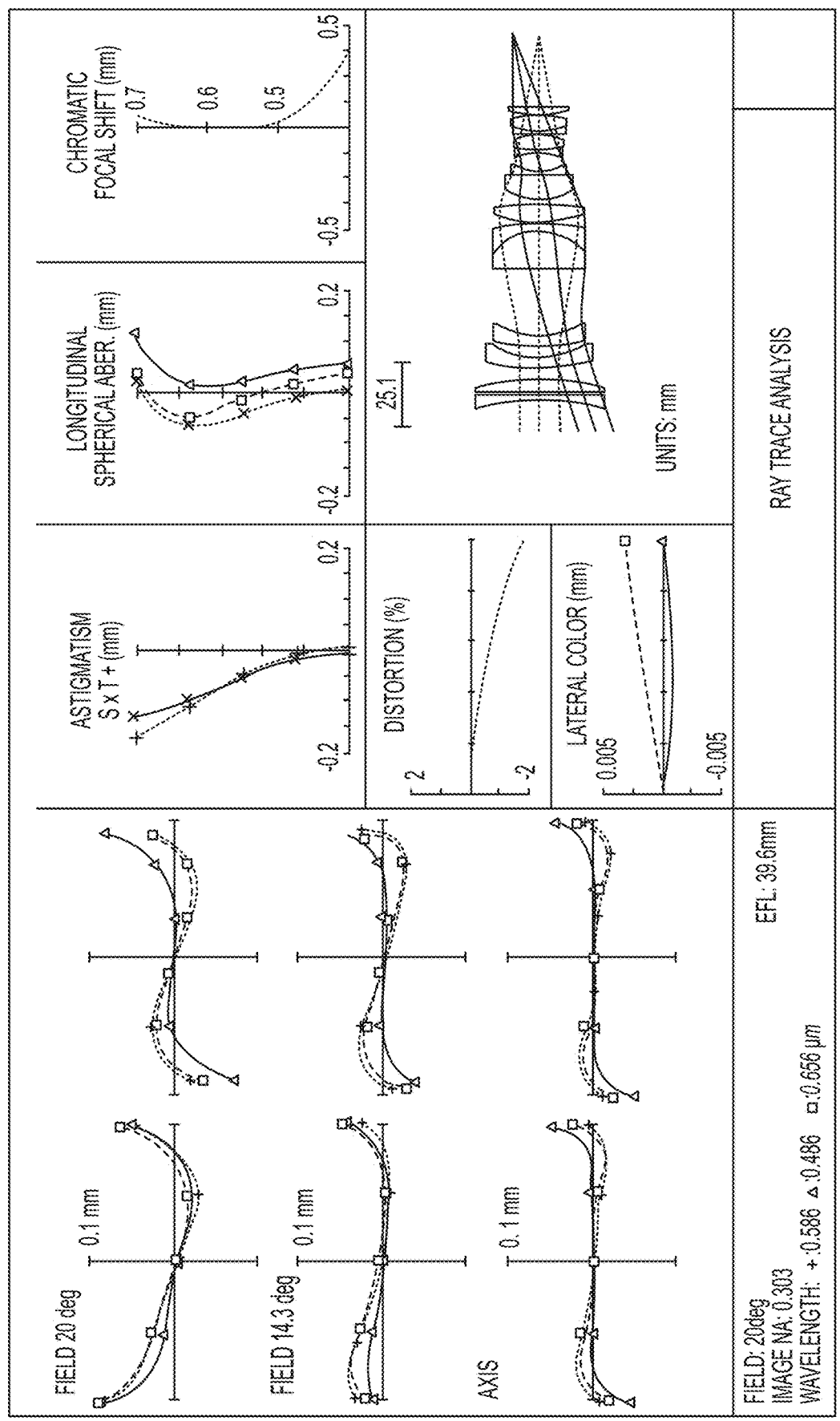
FIG. 19 illustrates a ray trace analysis of the lens group utilized in combination with the spherical lens in FIG. 17 according to an embodiment of the present disclosure.

FIG. 19 illustrates a ray trace analysis of the spherical lens 100 utilized in combination with the lens group 102 as shown in FIG. 17. As shown, the lens group 102 has induced non-rotationally symmetric optical aberrations in the spherical lens 100. The degree of the non-rotationally symmetric optical aberrations has increased, as shown between the comparison of FIGS. 15 and 16 with FIGS. 18 and 19. Enhanced coma, astigmatism, and flares result. The anamorphic compression may not exceed 1.09 for any axial direction. In other embodiments, even lesser compression may be produced.

Figure 20:
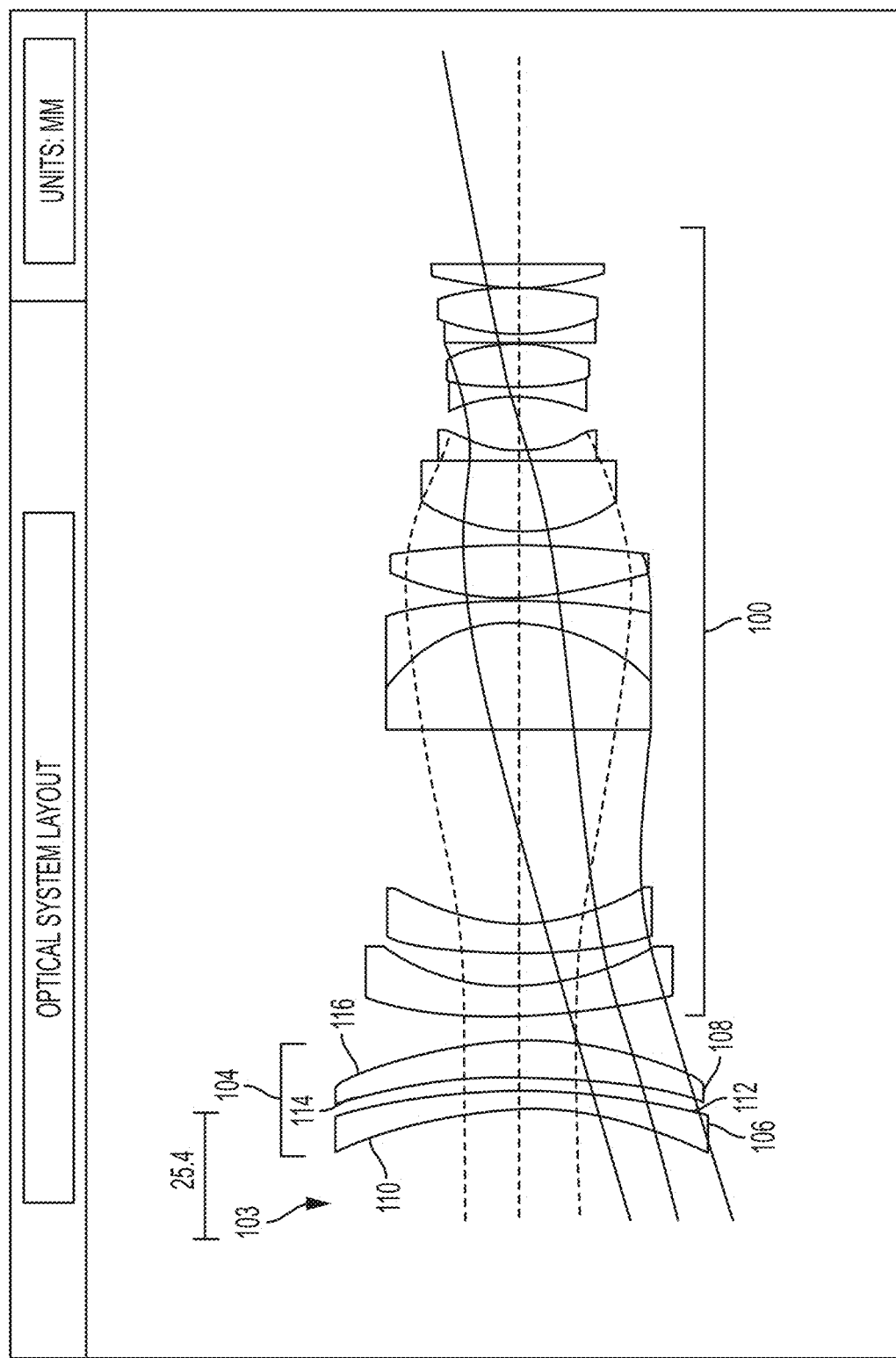
FIG. 20 illustrates a schematic of a lens group utilized in combination with the spherical lens that is shown in FIG. 14 according to an embodiment of the present disclosure.

FIG. 20 illustrates a schematic of a lens group 104 utilized in combination with the spherical lens 100. The lens group 104 may include a cylindrical lens element 106 and cylindrical lens element 108. Cylindrical lens element 106 may include a negative cylindrical lens surface 110 facing the object space 103, and a positive cylindrical lens surface 112 facing opposite the object space 103. The cylindrical lens element 106 comprises a cylindrical meniscus lens. The cylindrical lens element 108 may include a negative cylindrical lens surface 114 facing the object space 103, and a positive cylindrical lens surface 116 facing opposite the object space 103. The cylindrical lens element 108 comprises a cylindrical meniscus lens. The radii of curvature of the lens elements 106, 108 may be different, and the lens elements 106, 108 may have different thickness. However, the lens elements 106, 108 may be configured to have the same magnifications/dioptic power as each other. In other embodiments, other dimensions of lens elements 106, 108 may be provided than shown in FIG. 20.

The lens group 104 may be attached to the spherical lens 100 in a manner disclosed herein, for example, by being part of a removable attachment that removably attaches to the spherical lens 100. Such removable attachment may include clamping to a housing of the spherical lens 100. The lens group 104 is positioned between the spherical lens 100 and the object space 103.

Figure 21:
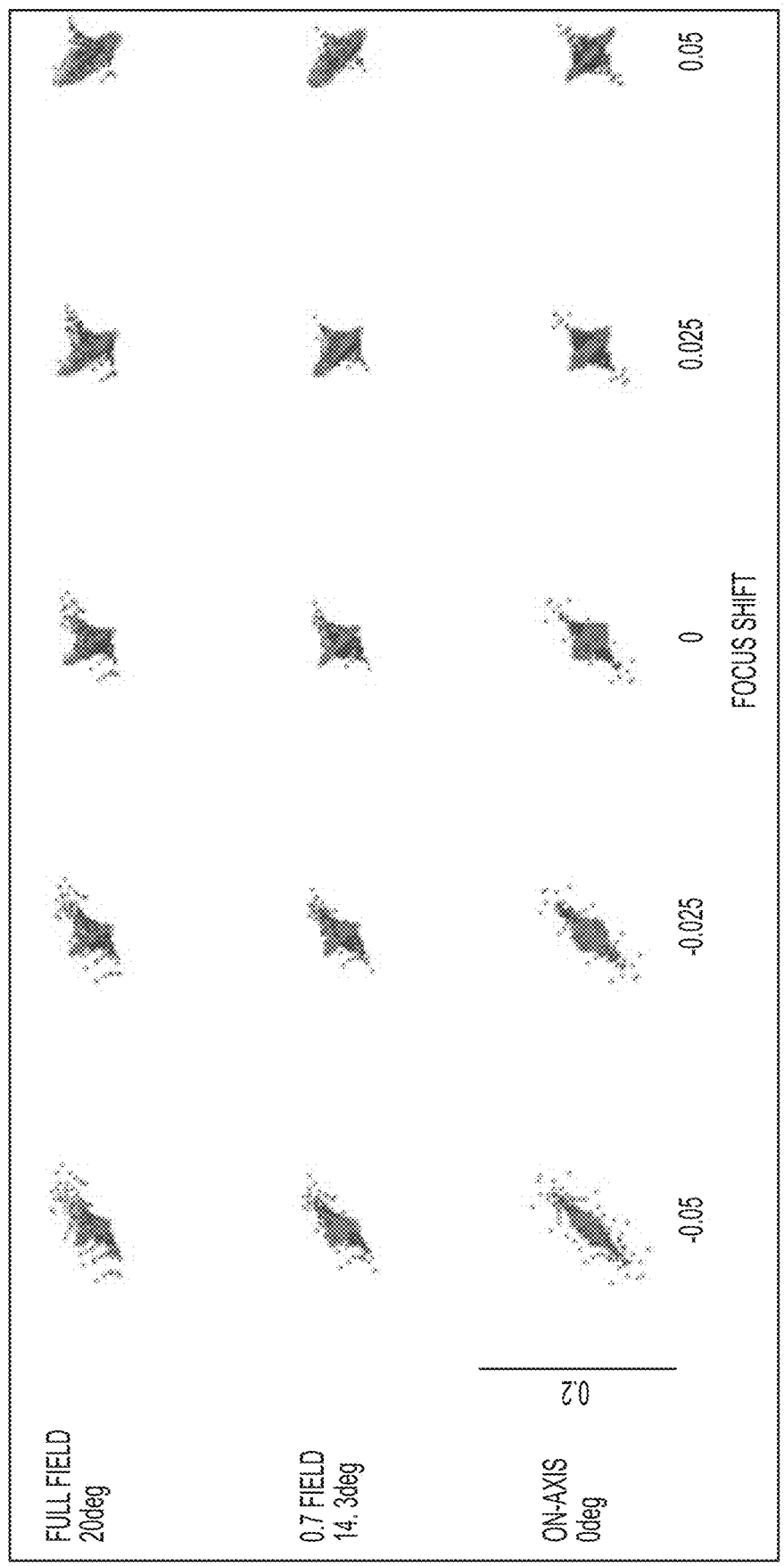
FIG. 21 illustrates a spot diagram analysis of the lens group utilized in combination with the spherical lens in FIG. 20 according to an embodiment of the present disclosure.

FIG. 21 illustrates the spot diagram analysis of the spherical lens 100 utilized in combination with the lens group 104 as shown in FIG. 20. The spherical lens 100 has the same structure as the spherical lens 100 shown in FIG. 14. However, the lens group 104 has induced non-rotationally symmetric optical aberrations in the spherical lens 100.

Figure 22:
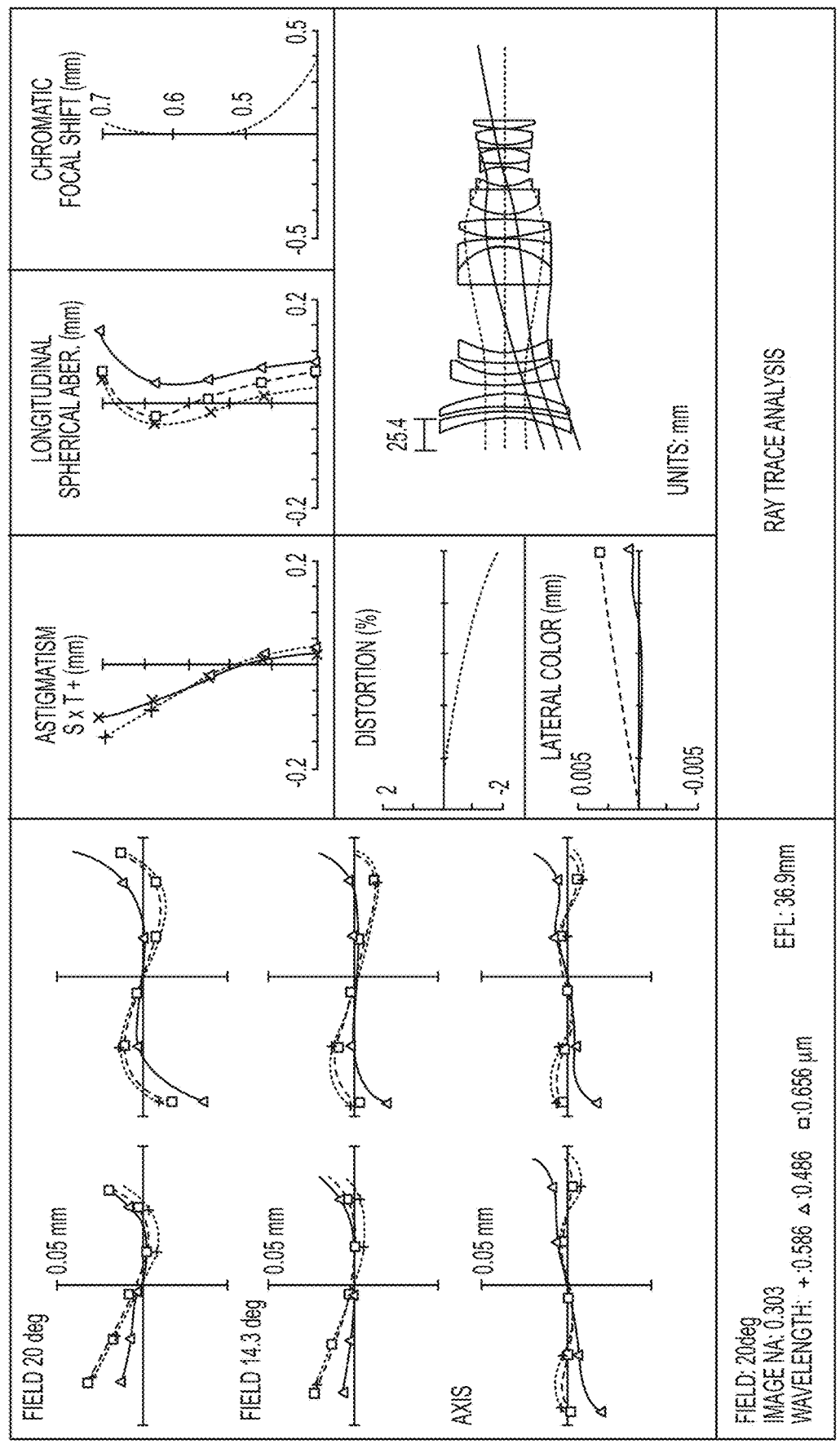
FIG. 22 illustrates a ray trace analysis of the lens group utilized in combination with the spherical lens in FIG. 20 according to an embodiment of the present disclosure.

FIG. 22 illustrates a ray trace analysis of the spherical lens 100 utilized in combination with the lens group 104 as shown in FIG. 20. As shown, the lens group 104 has induced non-rotationally symmetric optical aberrations in the spherical lens 100. The degree of the non-rotationally symmetric optical aberrations has increased, as shown between the comparison of FIGS. 15 and 16 and FIGS. 21 and 22. Enhanced coma, astigmatism, and flares result. The anamorphic compression may not exceed 1.09 for any axial direction. In other embodiments, even lesser compression may be produced.

Figure 23:
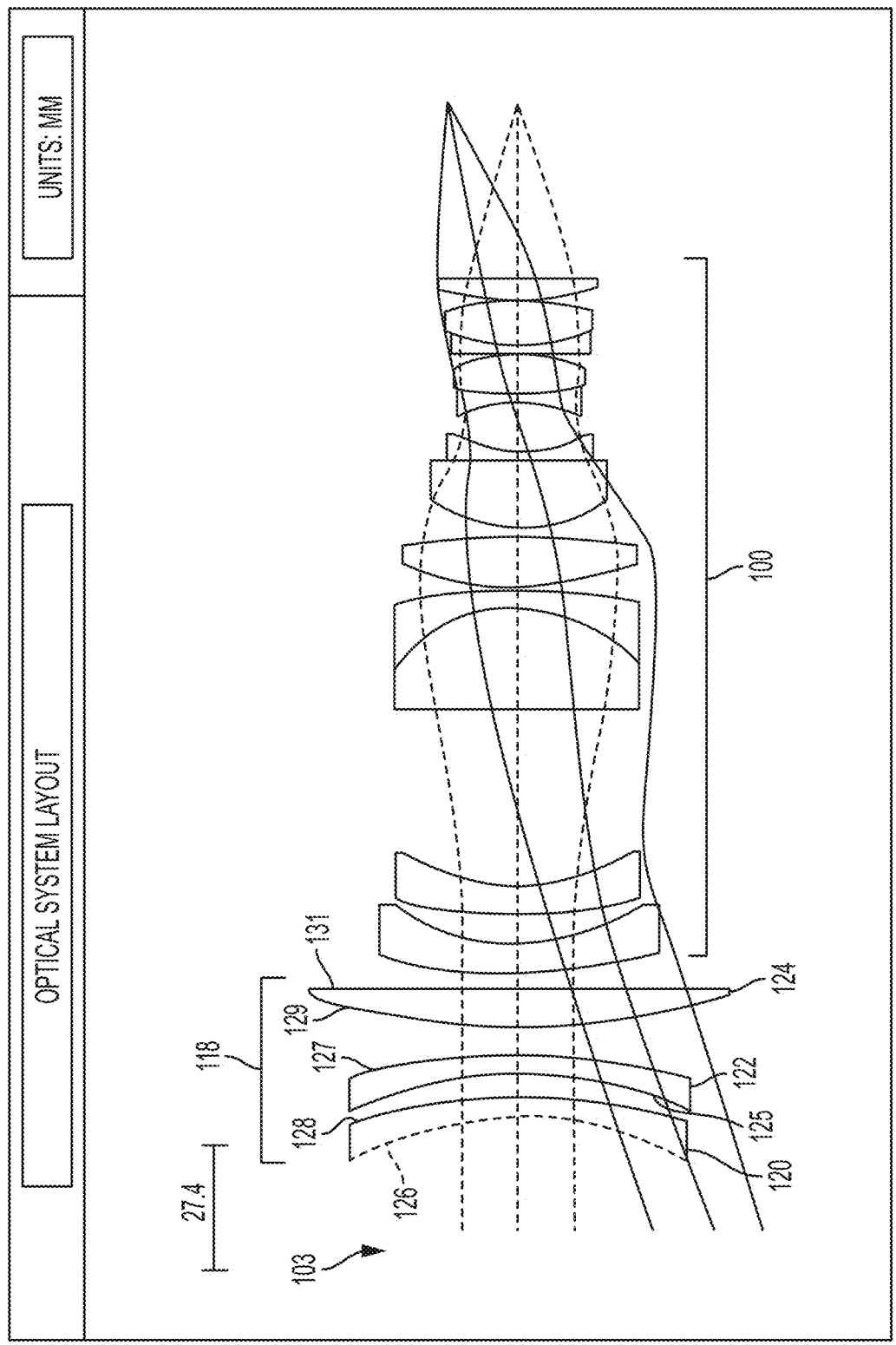
FIG. 23 illustrates a schematic of a lens group utilized in combination with the spherical lens that is shown in FIG. 14 according to an embodiment of the present disclosure.

FIG. 23 illustrates a schematic of a lens group 118 utilized in combination with the spherical lens 100. The lens group 118 may include a cylindrical lens element 120 and cylindrical lens element 122 and a spherical lens element 124. Cylindrical lens element 120 may include a negative cylindrical lens surface 126 facing the object space 103, and a positive cylindrical lens surface 128 facing opposite the object space 103. The cylindrical lens element 120 comprises a cylindrical meniscus lens. The cylindrical lens element 122 may include a negative cylindrical lens surface 125 facing the object space 103, and a positive cylindrical lens surface 127 facing opposite the object space 103. The cylindrical lens element 122 comprises a cylindrical meniscus lens. The radii of curvature of the lens elements 120, 122 is the same. The radius and thickness of the lens elements 120, 122 may be the same as each other. The substrate may also be the same. The spherical lens element 124 may include a positive spherical lens surface 129 facing the object space 103 and a planar lens surface 131 facing opposite the object space 103. The cylindrical lens element 122 may be positioned between the cylindrical lens element 120 and the spherical lens element 124.

The lens group 118 may be attached to the spherical lens 100 in a manner disclosed herein, for example, by being part of a removable attachment that removably attaches to the spherical lens 100. Such removable attachment may include clamping to a housing of the spherical lens 100. The lens group 118 is positioned between the spherical lens 100 and the object space 103.

Figure 24:
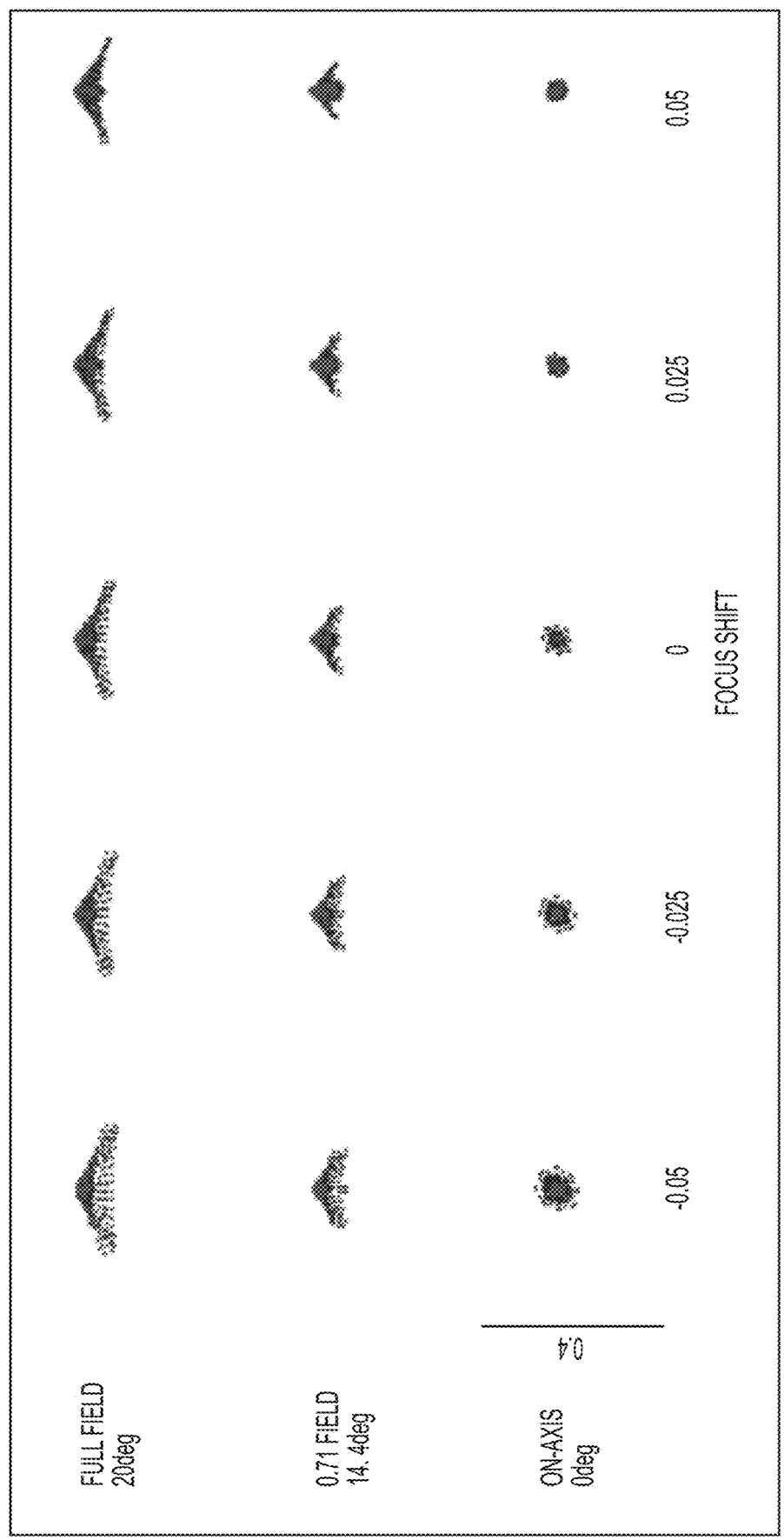
FIG. 24 illustrates a spot diagram analysis of the lens group utilized in combination with the spherical lens in FIG. 20 according to an embodiment of the present disclosure.

FIG. 24 illustrates the spot diagram analysis of the spherical lens 100 utilized in combination with the lens group 118 as shown in FIG. 23. The spherical lens 100 has the same structure as the spherical lens 100 shown in FIG. 14. However, the lens group 118 has induced non-rotationally symmetric optical aberrations in the spherical lens 100.

Figure 25:
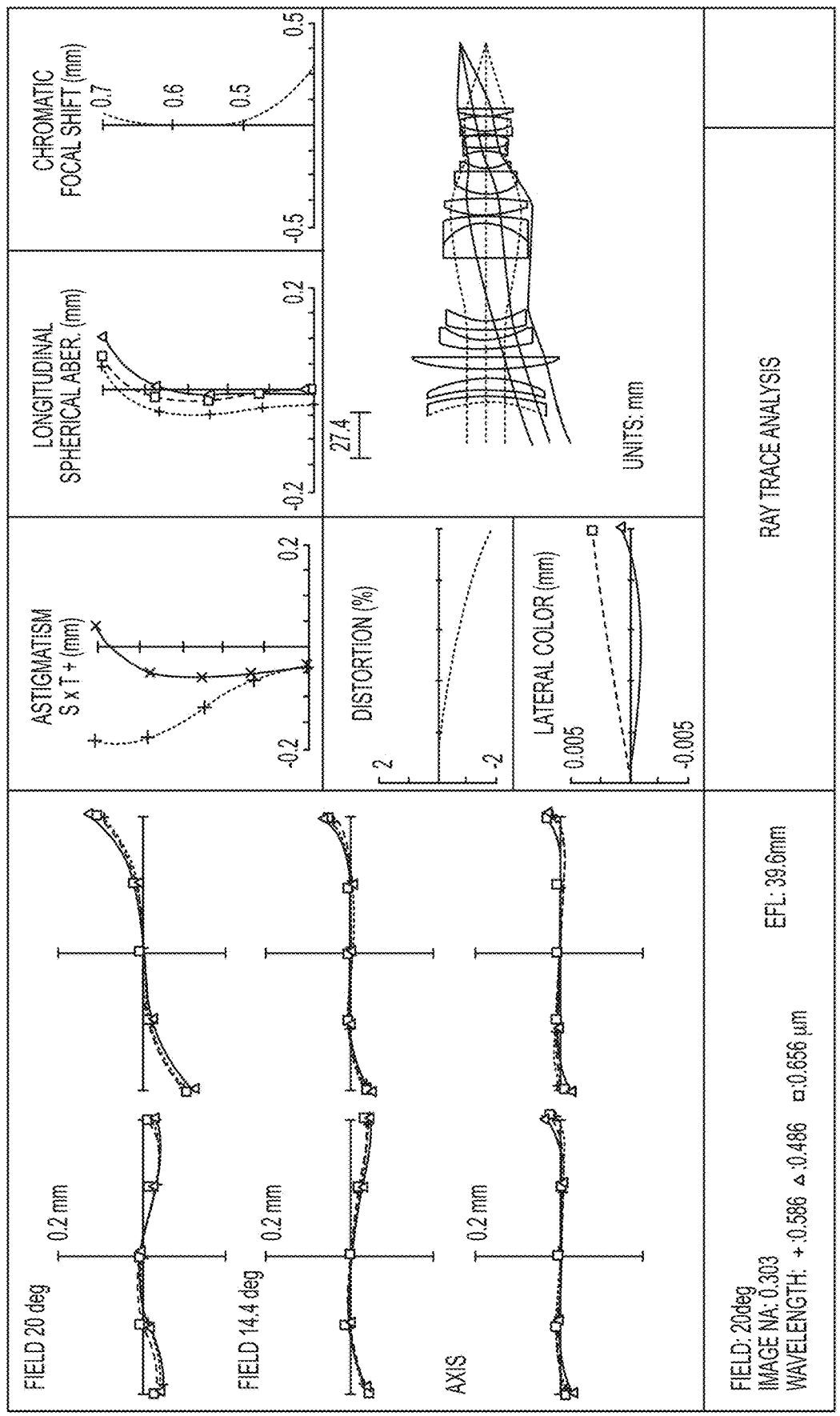
FIG. 25 illustrates a ray trace analysis of the lens group utilized in combination with the spherical lens in FIG. 20 according to an embodiment of the present disclosure.

FIG. 25 illustrates a ray trace analysis of the spherical lens 100 utilized in combination with the lens group 118 as shown in FIG. 23. As shown, the lens group 118 has induced non-rotationally symmetric optical aberrations in the spherical lens 100. The degree of the non-rotationally symmetric optical aberrations has increased, as shown between the comparison of FIGS. 15 and 16 and FIGS. 24 and 25. Enhanced coma, astigmatism, and flares result. The anamorphic compression may not exceed 1.09 for any axial direction. In other embodiments, even lesser compression may be produced.

Figure 26:
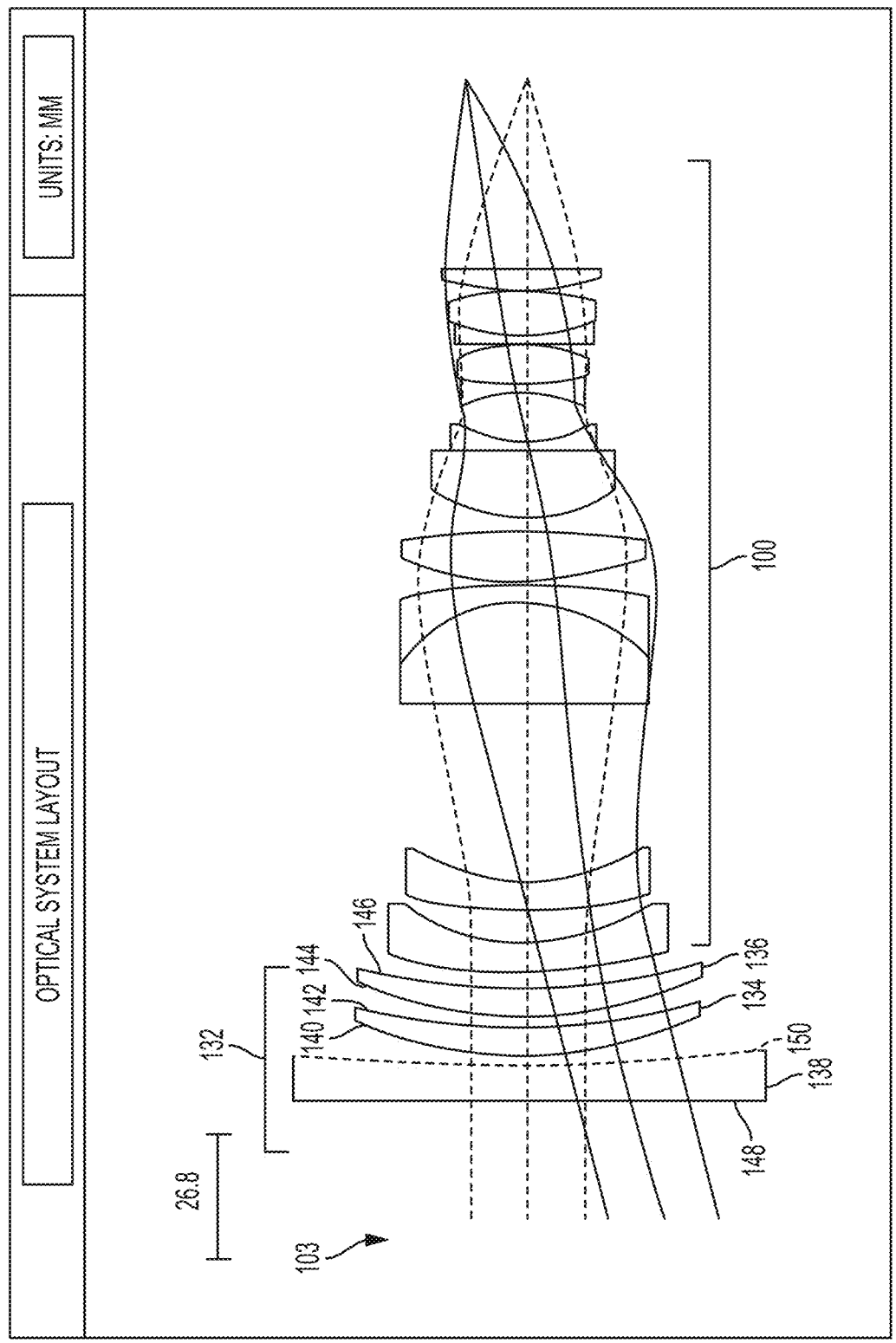
FIG. 26 illustrates a schematic of a lens group utilized in combination with the spherical lens that is shown in FIG. 14 according to an embodiment of the present disclosure.

FIG. 26 illustrates a schematic of a lens group 132 utilized in combination with the spherical lens 100. The lens group 132 may include a cylindrical lens element 134 and cylindrical lens element 136 and a spherical lens element 138. Cylindrical lens element 134 may include a positive cylindrical lens surface 140 facing the object space 103, and a negative cylindrical lens surface 142 facing opposite the object space 103. The cylindrical lens element 134 comprises a cylindrical meniscus lens. The cylindrical lens element 136 may include a positive cylindrical lens surface 144 facing the object space 103, and a negative cylindrical lens surface 146 facing opposite the object space 103. The cylindrical lens element 136 comprises a cylindrical meniscus lens. The radii of curvature of the lens elements 134, 136 is the same. The radius and thickness of the lens elements 134, 136 may be the same as each other. The substrate may also be the same. The spherical lens element 138 may include a planar spherical lens surface 148 facing the object space 103 and a negative lens surface 150 facing opposite the object space 103. The cylindrical lens element 134 may be positioned between the cylindrical lens element 136 and the spherical lens element 138.

The lens group 132 may be attached to the spherical lens 100 in a manner disclosed herein, for example, by being part of a removable attachment that removably attaches to the spherical lens 100. Such removable attachment may include clamping to a housing of the spherical lens 100. The lens group 132 is positioned between the spherical lens 100 and the object space 103.

Figure 27:
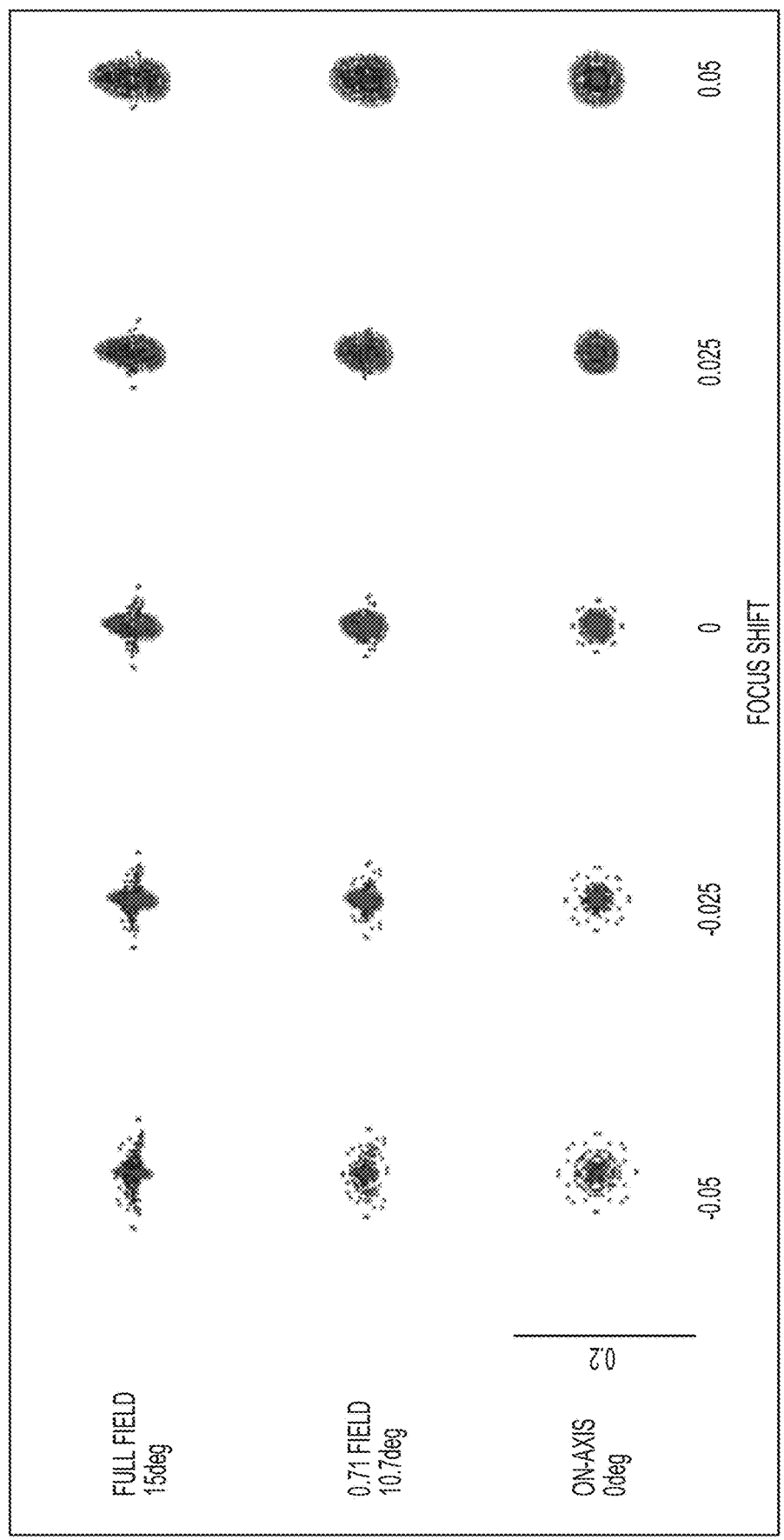
FIG. 27 illustrates a spot diagram analysis of the lens group utilized in combination with the spherical lens in FIG. 26 according to an embodiment of the present disclosure.

FIG. 27 illustrates the spot diagram analysis of the spherical lens 100 utilized in combination with the lens group 132 as shown in FIG. 26. The spherical lens 100 has the same structure as the spherical lens 100 shown in FIG. 14. However, the lens group 132 has induced non-rotationally symmetric optical aberrations in the spherical lens 100.

Figure 28:
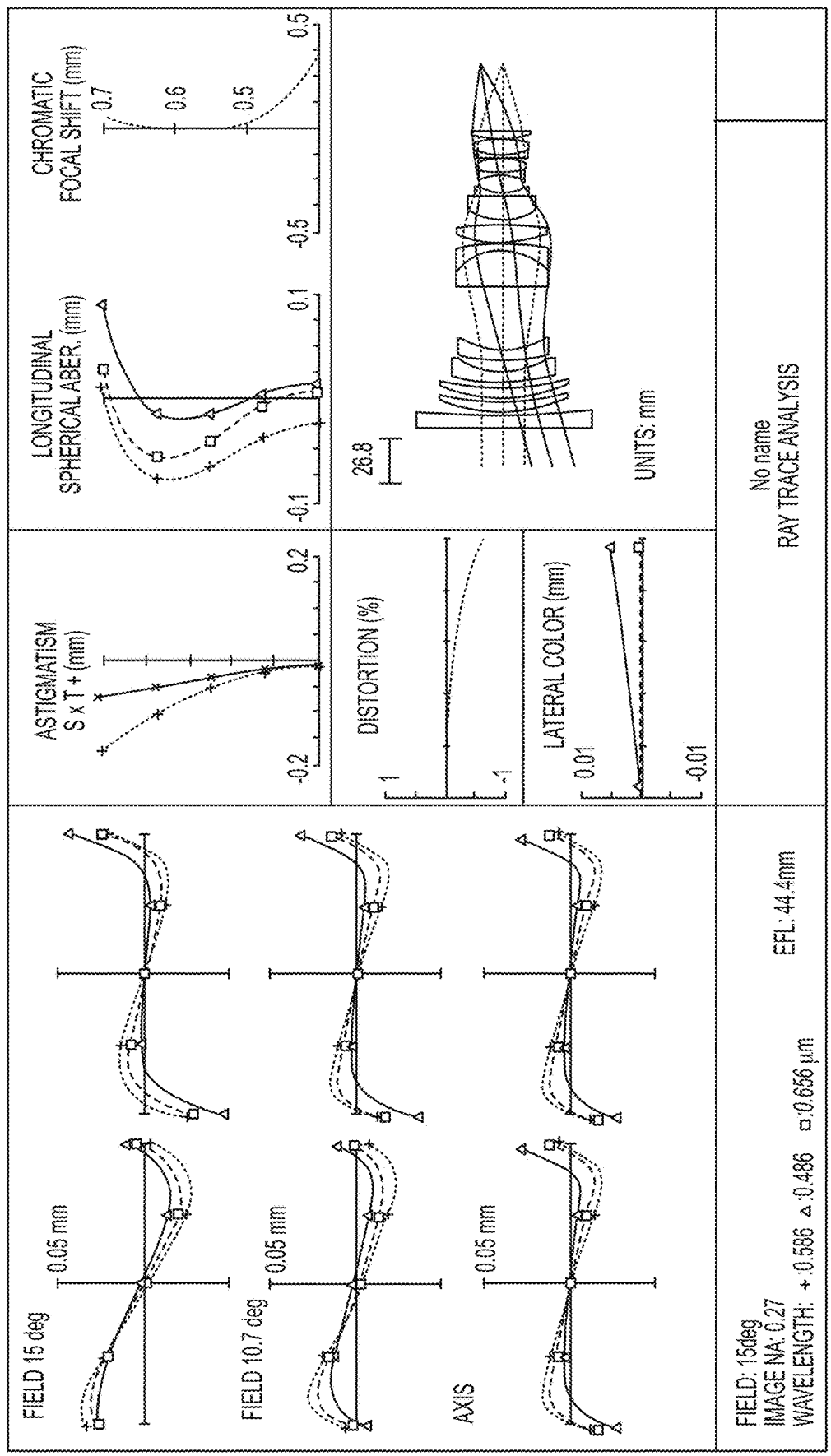
FIG. 28 illustrates a ray trace analysis of the lens group utilized in combination with the spherical lens in FIG. 26 according to an embodiment of the present disclosure.

FIG. 28 illustrates a ray trace analysis of the spherical lens 100 utilized in combination with the lens group 132 as shown in FIG. 26. As shown, the lens group 132 has induced non-rotationally symmetric optical aberrations in the spherical lens 100. The degree of the non-rotationally symmetric optical aberrations has increased, as shown between the comparison of FIGS. 15 and 16 and FIGS. 27 and 28. Enhanced coma, astigmatism, and flares result. The anamorphic compression may not exceed 1.09 for any axial direction. In other embodiments, even lesser compression may be produced.

The lens groups 102, 104, 118, 132 may each be utilized with a housing, such as the housing 14 disclosed in regard to FIGS. 1-4. Any of the lens groups 12, 102, 104, 118, 132 may be part of a removable attachment. The removable attachments may be configured to rotate relative to the lens to which it is attached. The rotation of the removable attachment may rotate the respective lens groups 12, 102, 104, 118, 132 relative to the lens to which it is attached, and may cause the direction of the non-rotationally symmetric optical aberrations to vary. For example, the direction of the non-rotationally symmetric optical aberrations shown in FIGS. 18, 21, 24, and 27 may be varied, or rotated, as desired. For a housing such as the housing 14 shown in FIGS. 1-4, the rotation may be allowed by simply loosening the clamp 34 and rotating the housing 14 relative to the lens to which it is attached.

The non-rotationally symmetric optical aberrations shown and described in regard to FIGS. 18, 19, 21, 22, 24, 25, 27, and 28 are exemplary, and may be varied in other embodiments. The non-rotationally symmetric optical aberrations may be induced in a spherical lens that does not have any optical aberrations. The non-rotationally symmetric optical aberrations may be induced in a spherical lens that has optical aberrations, such as the spherical lens 100 shown in FIG. 14.

Figure 29:
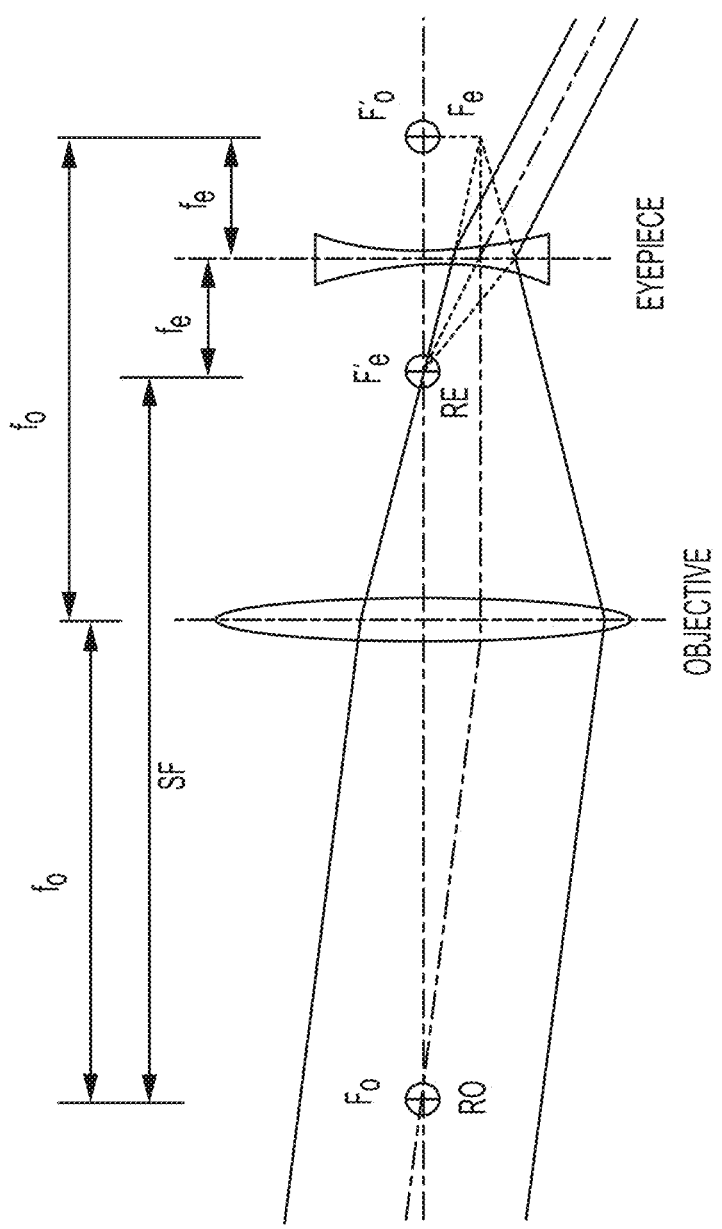
FIG. 29 illustrates a reference diagram.

The lens groups disclosed herein may satisfy optical conditions. The optical conditions are discussed in regard to the reference diagram shown in FIG. 29. The lens groups may each satisfy the following equations, in which "$x_e$," "$y_e$," and "$z_e$" are the respective x, y, and z coordinates in the image space; "$x_o$," "$y_o$," and "$z_o$" are the respective x, y, and z coordinates in the object space; "m" is the linear magnification; "M" is the angular magnification; $f_0$ is the focal length of an objective; $f_e$ is the focal length of an eyepiece; $u_{pe}$ is the image height; $u_{po}$ is the principal ray angle; and SF is the separation between a reference point (RO) at the front focal point ($F_0$) of the objective and a reference point (RE) at the rear focal point ($F_e'$) of the eyepiece. The equations are as follows:

$$x_e = mx_o = (x_0/M) \tag{1}$$

$$y_e = my_o = (y_0/M) \tag{2}$$

$$z_e = m^2 z_o = (z_0/M^2) \tag{3}$$

$$m = -(f_e/f_0) \tag{4}$$

$$M = -(f_0/f_e) = (\tan(u_{pe}))/(\tan(u_{po})) \tag{5}$$

$$SF = 2f_e + 2f_0 = 2(1-M)f_e = 2(1-m)f_0 \tag{6}$$

FIGS. 30A, B illustrate an embodiment of a lens group 152 including a cylindrical lens element 154 and cylindrical lens element 156. The cylindrical lens elements 154, 156 may correspond to the cylindrical lens elements disclosed in regard to lens groups 12, 102, 104, 118, 132, with the cylindrical lens element 154 corresponding to the cylindrical lens element that is closer to the object space in those lens groups, and the cylindrical lens element 156 corresponding to the cylindrical lens element that is further from the object space in those lens groups. In the embodiment shown in FIGS. 30a, b, the lens group 152 may be configured to produce similar non-rotationally symmetric optical aberrations as disclosed in regard to lens groups 12, 102, 104, 118, 132. However, the cylindrical lens elements 154, 156 are not fixed in relation to each other, and may move rotationally about an optical axis relative to each other, and may move axially along the optical axis relative to each other. The cylindrical lens elements 154, 156 in an unrotated state are shown in FIGS. 31A, B and in a rotated state with axial movement are shown in FIG. 32A, B.

The rotational and axial movement may be utilized to induce magnifications in the images produced by the lens group 152. In addition, the shape and nature of the non-rotationally symmetric optical aberrations may vary in response to the rotational and axial movement.

In one embodiment, the axial movement of the cylindrical lens elements 154, 156 may not be utilized, and only rotation of the cylindrical lens elements 154, 156 may occur. The rotation may produce a magnification change without an axial movement.

In one embodiment, the lens groups disclosed herein may be utilized not to induce non-rotationally symmetric optical aberrations in a spherical lens, but may be used to correct aberrations present in a spherical lens. In an embodiment in which the spherical lens includes non-rotationally symmetric optical aberrations, the lens groups may be applied thereon to reduce the effect of these non-rotationally symmetric optical aberrations, and thereby correct the lens.

In one embodiment, any or all of the lens elements of the lens groups disclosed herein may be provided with coatings that vary the non-rotationally symmetric optical aberrations produced by the lens groups.

In one embodiment, the lens groups disclosed herein may not be provided as part of a removable attachment. Rather, the lens groups may be integrated with a lens, such as a spherical lens, and may be positioned within the housing of such a lens. The lens groups may comprise a permanent element of such a lens.

In one embodiment, the lens groups disclosed herein may be utilized in combination with a cylindrical lens or anamorphic lens system, rather than a spherical lens. The cylindrical lens or anamorphic lens system may include non-rotationally symmetrical optical aberrations, and the use of the lens groups herein may induce non-rotationally symmetrical optical aberrations to increase or enhance the severity of the non-rotationally symmetrical optical aberrations. Thus, enhanced aberrations associated with anamorphic lenses may be provided.

Any of the lens groups or removable attachments disclosed herein may be utilized in a system. The system may include a lens, which may be a spherical or anamorphic lens. The lens may be used as part of a camera system and may comprise a camera lens. The camera system may include a filming camera system (e.g., film or digital), a still photography camera system, a camera system for a mobile device (e.g., a phone camera), or other forms of camera systems. Any of the apparatuses or methods disclosed herein may be utilized as part of a system.

The present disclosure includes methods of inducing non-rotationally symmetric optical aberrations in a lens. The present disclosure also includes methods of utilizing any of the lens groups or removable attachments disclosed herein. Any of the processes or steps disclosed herein may comprise a method within the scope of the present disclosure. For example, a method may include providing a removable attachment including a lens group including at least two cylindrical lens elements, and a housing coupled to the lens group and configured to removably attach to a lens such that the lens group is positioned between an object space and the lens when the housing is attached to the lens. A method may include inducing, with the lens group, non-rotationally symmetric optical aberrations in the lens.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein. The term "same" means that the characteristic, item, quantity, parameter, property, or term so qualified encompasses an approximation that may vary slightly, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An attachment for use with a camera lens, wherein the attachment comprises a housing configured to connect with the camera lens and accommodate placement of a lens group therein, wherein the lens group comprises lens elements, and wherein the lens group is configured to induce non-rotationally symmetric optical aberrations in the camera lens without significant image compression in any axial dimension.

2. The attachment as recited in claim 1, wherein the lens group is interposed between an object space and the camera lens.

3. The attachment as recited in claim 1, wherein the lens group comprises two lens elements that are each aligned with an optical axis of the camera lens.

4. The attachment as recited in claim 1, wherein any image compression caused by the lens group is less than 1.09.

5. The attachment as recited in claim 1, wherein at least one of the lens elements comprises a cylindrical lens surface.

6. The attachment as recited in claim 1, wherein the lens elements are fixed in the housing.

7. The attachment as recited in claim 1, wherein the camera lens is spherical.

8. The attachment as recited in claim 1, comprising a shim interposed between the lens elements to provide a desired spacing therebetween within the housing.

9. The attachment as recited in claim 1, wherein the non-rotationally symmetric optical aberrations are selected from the group consisting of astigmatism, coma, flare, and combinations thereof.

10. A method for inducing optical aberrations in a camera lens comprising:
attaching a housing to a camera lens, wherein the housing comprises a lens group disposed therein including lens elements, and wherein the lens group is interposed between an object space and the camera lens; and
processing an image from the object space through the lens group to induce non-rotationally symmetric optical aberrations in the camera lens without significant image compression in any axial dimension.

11. The method as recited in claim 10, wherein during the step of processing, any image compression is less than 1.09.

12. The method as recited in claim 10, wherein during the step of processing, the image passes through two or more lens elements.

13. The method as recited in claim 10, wherein during the step of processing, the image passes through a lens element comprising a cylindrical lens surface.

14. The method as recited in claim 10, wherein during the step of processing, the lens elements are fixed within the housing.

15. The method as recited in claim 10, wherein during the step of processing, the image passes through two cylindrical lens surfaces of the lens elements.

16. A camera system comprising:
a camera lens;
an attachment interposed between an object space and the camera lens, wherein the attachment comprising:
a housing; and
a lens group disposed within the housing comprising lens elements, wherein the lens elements are aligned with an optical axis of the camera lens, wherein the lens elements are fixed within the housing, wherein the lens group is configured to induce non-rotationally symmetric optical aberrations in the camera lens and not produce significant image compression in any axial dimension.

17. The camera system as recited in claim 16, wherein each of the lens elements comprise a cylindrical lens surface.

18. The camera system as recited in claim 17, wherein a first lens element comprises a positive cylindrical lens surface that faces toward the object space, and wherein a second element comprises a negative cylindrical lens surface that faces towards the camera lens.

19. The camera system as recited in claim 16, wherein the camera lens is spherical.

* * * * *